(12) United States Patent　　(10) Patent No.:　　US 11,394,799 B2
　　Jackson　　　　　　　　　　(45) Date of Patent:　　　　Jul. 19, 2022

(54) METHODS, SYSTEMS, APPARATUSES, AND DEVICES FOR FACILITATING FOR GENERATION OF AN INTERACTIVE STORY BASED ON NON-INTERACTIVE DATA

(71) Applicant: Freeman Augustus Jackson, Tallahassee, FL (US)

(72) Inventor: Freeman Augustus Jackson, Tallahassee, FL (US)

( * ) Notice: Subject to any disclaimer, the term of this patent is extended or adjusted under 35 U.S.C. 154(b) by 0 days.

(21) Appl. No.: 17/030,197

(22) Filed: Sep. 23, 2020

(65) Prior Publication Data

US 2021/0352160 A1　　Nov. 11, 2021

Related U.S. Application Data

(60) Provisional application No. 63/021,154, filed on May 7, 2020.

(51) Int. Cl.
　　*H04L 67/306*　　(2022.01)
　　*H04L 67/02*　　(2022.01)
　　　　(Continued)

(52) U.S. Cl.
　　CPC ............ *H04L 67/306* (2013.01); *H04L 67/02* (2013.01); *H04L 67/10* (2013.01); *H04L 67/38* (2013.01)

(58) Field of Classification Search
　　None
　　See application file for complete search history.

(56) References Cited

U.S. PATENT DOCUMENTS 6,922,726 B2　　7/2005　Basson et al.
7,139,747 B1　　11/2006　Najork
　　　　(Continued)

FOREIGN PATENT DOCUMENTS

CN　　　110782900 A　　2/2020
KR　　1020190095602　　　8/2019
　　　　(Continued)

OTHER PUBLICATIONS

Latzer, M., Hollnbuchner, K., Just, N., & Saurwein, F. The economics of algorithmic selection on the Internet. In Handbook on the Economics of the Internet. Edward Elgar Publishing. 2016.
　　　　(Continued)

*Primary Examiner* — Lashonda T Jacobs

(57) ABSTRACT

Further disclosed herein is a system for facilitating generation of an interactive story based on non-interactive data, in accordance with some embodiments. Accordingly, the system may include a communication device, a processing device, and a storage device. Further, the communication device may be configured for receiving non-interactive data from a source device, transmitting interactive story data to a user device, receiving a request from the user device, and transmitting a response to the user device. Further, the processing device may be configured for analyzing the non-interactive data, generating the interactive story data based on the analyzing, analyzing the at least one request, and generating the response based on the analyzing of the interactive story data and the analyzing of the request. Further, the storage device may be configured for storing the non-interactive data, the interactive story data, the request, and the response.

16 Claims, 16 Drawing Sheets

(51) Int. Cl.
*H04L 67/131* (2022.01)
*H04L 67/10* (2022.01)

(56) References Cited

U.S. PATENT DOCUMENTS

| | | |
|---|---|---|
| 7,188,318 B2 | 3/2007 | Spisak |
| 7,246,315 B1 | 7/2007 | Andrieu |
| 7,333,967 B1 | 2/2008 | Bringsjord |
| 7,627,536 B2 | 12/2009 | Kacmarcik |
| 8,332,741 B2 | 12/2012 | Evans et al. |
| 8,381,108 B2* | 2/2013 | Fuller .................... A63F 13/12 715/727 |
| 8,694,303 B2 | 4/2014 | Hopkins et al. |
| 8,892,417 B1 | 11/2014 | Nichols et al. |
| 8,892,555 B2 | 11/2014 | Jeong et al. |
| 8,918,357 B2 | 12/2014 | Minocha et al. |
| 8,972,375 B2 | 3/2015 | Opalinski |
| 9,208,147 B1 | 12/2015 | Nichols et al. |
| 9,251,134 B2 | 2/2016 | Birnbaum |
| 9,348,411 B2 | 5/2016 | Paek |
| 9,529,911 B2 | 12/2016 | Richard et al. |
| 9,576,052 B2 | 2/2017 | Singh et al. |
| 9,589,233 B2 | 3/2017 | Peev |
| 9,697,492 B1 | 7/2017 | Birnbaum |
| 9,720,884 B2 | 8/2017 | Birnbaum |
| 9,720,899 B1 | 8/2017 | Birnbaum |
| 9,721,207 B2 | 8/2017 | Cama |
| 9,753,916 B2 | 9/2017 | Aharoni |
| 9,760,561 B2 | 9/2017 | Myslinski |
| 9,772,994 B2 | 9/2017 | Karov et al. |
| 9,804,820 B2 | 10/2017 | Quast et al. |
| 9,830,044 B2 | 11/2017 | Brown et al. |
| 9,858,039 B2 | 1/2018 | Kumar |
| 9,875,234 B2 | 1/2018 | Myslinski |
| 9,886,950 B2 | 2/2018 | Karov et al. |
| 9,953,022 B2 | 4/2018 | Haine |
| 9,977,773 B1 | 5/2018 | Birnbaum |
| 9,977,826 B2 | 5/2018 | Gorelick |
| 9,984,164 B2* | 5/2018 | Walther .............. G06F 16/951 |
| 9,990,357 B2 | 6/2018 | Myslinski |
| 9,990,358 B2 | 6/2018 | Myslinski |
| 9,992,338 B2 | 6/2018 | Eisner et al. |
| 10,031,901 B2* | 7/2018 | Chakra ............... G06F 16/345 |
| 10,089,082 B2 | 10/2018 | Douglas et al. |
| 10,120,668 B2 | 11/2018 | Palavalli et al. |
| 10,185,477 B1 | 1/2019 | Paley |
| 10,255,252 B2* | 4/2019 | Dale ................... G06F 40/279 |
| 10,304,446 B2 | 5/2019 | Goslin |
| 10,361,982 B2* | 7/2019 | Longdale ............... H04L 51/16 |
| 10,412,456 B2 | 9/2019 | Zalewski |
| 10,424,293 B1* | 9/2019 | Markley ............... G10L 13/02 |
| 10,424,295 B2 | 9/2019 | Haseltine |
| 10,482,381 B2 | 11/2019 | Nichols |
| 10,489,488 B2 | 11/2019 | Birnbaum |
| 10,572,606 B1 | 2/2020 | Paley |
| 10,585,983 B1 | 3/2020 | Paley |
| 10,614,112 B2 | 4/2020 | Myslinski |
| 10,657,201 B1 | 5/2020 | Nichols |
| 10,680,993 B2 | 6/2020 | Snibbe |
| 10,699,079 B1 | 6/2020 | Paley |
| 10,706,236 B1 | 7/2020 | Platt |
| 10,706,347 B2 | 7/2020 | Garcia |
| 10,713,442 B1 | 7/2020 | Paley |
| 10,719,542 B1 | 7/2020 | Paley |
| 10,740,376 B2 | 8/2020 | Myslinski |
| 10,747,823 B1* | 8/2020 | Birnbaum ............... G06F 16/95 |
| 10,755,042 B2 | 8/2020 | Birnbaum |
| 10,755,046 B1 | 8/2020 | Meza |
| 10,755,053 B1 | 8/2020 | Paley |
| 10,762,304 B1 | 9/2020 | Paley |
| 10,776,579 B2 | 9/2020 | Mishra |
| 10,789,755 B2 | 9/2020 | Amer |
| 10,799,186 B2 | 10/2020 | Howard |
| 10,832,118 B2 | 11/2020 | Rakshit |
| 10,848,899 B2 | 11/2020 | Lyren |
| 10,853,583 B1 | 12/2020 | Platt |
| 10,885,274 B1 | 1/2021 | Somasundaran |
| 10,909,313 B2 | 2/2021 | Can |
| 10,909,324 B2 | 2/2021 | Eisenberg |
| 10,943,069 B1 | 3/2021 | Paley |
| 10,957,325 B2 | 3/2021 | Hergenroeder |
| 10,963,649 B1 | 3/2021 | Sippel |
| 10,963,650 B2 | 3/2021 | Reiter |
| 10,970,096 B2 | 4/2021 | Krishna |
| 10,990,767 B1 | 4/2021 | Smathers |
| 10,997,503 B2 | 5/2021 | Dohan |
| 11,023,689 B1 | 6/2021 | Sippel |
| 11,030,408 B1 | 6/2021 | Meza |
| 11,042,709 B1 | 6/2021 | Pham |
| 11,057,236 B2 | 7/2021 | Panec |
| 11,068,661 B1 | 7/2021 | Nichols |
| 11,087,201 B2 | 8/2021 | Hua |
| 11,107,465 B2 | 8/2021 | Gustman |
| 11,113,447 B2 | 9/2021 | Ben-Ishay |
| 11,114,085 B2 | 9/2021 | Kumar |
| 11,120,839 B1 | 9/2021 | Siagian |
| 11,126,798 B1 | 9/2021 | Meza |
| 11,138,375 B2 | 10/2021 | Avedissian |
| 11,144,709 B2 | 10/2021 | Dale |
| 11,144,838 B1 | 10/2021 | Platt |
| 11,250,630 B2* | 2/2022 | Knipp .................. H04N 9/3185 |
| 2004/0091848 A1* | 5/2004 | Nemitz ................... A63F 13/69 434/365 |
| 2007/0065787 A1* | 3/2007 | Raffel .................. A63F 9/0612 434/177 |
| 2007/0265850 A1* | 11/2007 | Kennewick ............ G10L 15/22 704/E15.04 |
| 2009/0327898 A1* | 12/2009 | Kim .................... G11B 27/034 707/999.1 |
| 2010/0094835 A1 | 4/2010 | Lu |
| 2010/0299149 A1* | 11/2010 | Kurzweil ............... G10L 13/00 704/260 |
| 2011/0060990 A1 | 3/2011 | Gross |
| 2011/0107217 A1* | 5/2011 | Schwarz ................ G09B 5/062 715/730 |
| 2012/0191745 A1 | 7/2012 | Velipasaoglu |
| 2012/0290566 A1 | 11/2012 | Dasher |
| 2013/0006971 A1 | 1/2013 | Dasher |
| 2013/0035930 A1 | 2/2013 | Ferrucci |
| 2013/0035931 A1 | 2/2013 | Ferrucci |
| 2013/0156347 A1 | 6/2013 | Dasher |
| 2013/0191728 A1* | 7/2013 | McKinney ............ G06F 40/166 715/243 |
| 2013/0275406 A1 | 10/2013 | Richard |
| 2014/0108144 A1 | 4/2014 | Kumar |
| 2014/0195222 A1* | 7/2014 | Peevers .................. G10L 21/00 704/201 |
| 2014/0297264 A1 | 10/2014 | Etzioni |
| 2015/0073798 A1 | 3/2015 | Karov |
| 2015/0375115 A1* | 12/2015 | Bunting ................ A63F 13/214 463/29 |
| 2016/0063876 A1* | 3/2016 | Javidan ................... G09B 5/06 715/201 |
| 2016/0266740 A1* | 9/2016 | Glasgow ................ G06F 16/71 |
| 2017/0032249 A1 | 2/2017 | Chougule |
| 2017/0053541 A1* | 2/2017 | Tsyrina ................... G09B 5/02 |
| 2017/0056771 A1* | 3/2017 | Davis ................ H04N 21/8456 |
| 2017/0061017 A1 | 3/2017 | Lim |
| 2017/0140055 A1 | 5/2017 | Grehant |
| 2017/0243517 A1* | 8/2017 | Midmore ................ G06F 3/017 |
| 2017/0308800 A1 | 10/2017 | Cichon |
| 2018/0190269 A1 | 7/2018 | Lokeswarappa |
| 2018/0218238 A1 | 8/2018 | Viirre |
| 2018/0239582 A1 | 8/2018 | Goss |
| 2019/0073660 A1 | 3/2019 | Aung |
| 2019/0205745 A1 | 7/2019 | Sridharan |
| 2019/0251702 A1 | 8/2019 | Chandler |
| 2019/0258700 A1 | 8/2019 | Beaver |
| 2019/0266250 A1 | 8/2019 | Toplyn |
| 2019/0273972 A1* | 9/2019 | Soderbergh ........ H04N 21/8545 |
| 2019/0251344 A1 | 10/2019 | Margaglia |
| 2019/0318243 A1 | 10/2019 | Margaglia |
| 2019/0318262 A1 | 10/2019 | Meinders |

(56) References Cited

U.S. PATENT DOCUMENTS

| | | |
|---|---|---|
| 2019/0325572 A1 | 10/2019 | Mansi |
| 2019/0332419 A1 | 10/2019 | Chandler |
| 2019/0356969 A1* | 11/2019 | Coughlin ........... H04N 21/8455 |
| 2020/0019370 A1 | 1/2020 | Doggett |
| 2020/0027444 A1 | 1/2020 | Prabhavalkar |
| 2020/0034609 A1 | 1/2020 | Chandler |
| 2020/0042867 A1 | 2/2020 | Shao |
| 2020/0043483 A1 | 2/2020 | Prabhavalkar |
| 2020/0050942 A1 | 2/2020 | Sun |
| 2020/0074300 A1 | 3/2020 | Newman |
| 2020/0097849 A1 | 3/2020 | Kelly |
| 2020/0118029 A1 | 4/2020 | DeBraal |
| 2020/0126538 A1 | 4/2020 | Han |
| 2020/0143206 A1 | 5/2020 | Kartal |
| 2020/0153776 A1 | 5/2020 | Qiu |
| 2020/0160852 A1 | 5/2020 | Markley |
| 2020/0225317 A1 | 7/2020 | Chen |
| 2020/0227032 A1 | 7/2020 | Toplyn |
| 2020/0242516 A1 | 7/2020 | Dhingra |
| 2020/0243076 A1 | 7/2020 | Kim |
| 2020/0260160 A1* | 8/2020 | Watson ............ H04N 21/44016 |
| 2020/0278991 A1 | 9/2020 | Canter |
| 2020/0302159 A1 | 9/2020 | Yellepeddi |
| 2020/0380361 A1 | 12/2020 | Tanach |
| 2020/0387697 A1 | 12/2020 | Chandler |
| 2020/0394848 A1 | 12/2020 | Choudhary |
| 2021/0019354 A1 | 1/2021 | Mallick |
| 2021/0028955 A1 | 1/2021 | Conde |
| 2021/0035125 A1 | 2/2021 | Casey |
| 2021/0035563 A1 | 2/2021 | Cartwright |
| 2021/0056376 A1* | 2/2021 | Panayiotou ........ G06K 19/0723 |
| 2021/0056378 A1 | 2/2021 | Yang |
| 2021/0064650 A1 | 3/2021 | McCarty |
| 2021/0079752 A1 | 3/2021 | Camp |
| 2021/0081443 A1 | 3/2021 | Cannon |
| 2021/0097444 A1 | 4/2021 | Bansal |
| 2021/0103700 A1 | 4/2021 | Toplyn |
| 2021/0103838 A1 | 4/2021 | Yuan |
| 2021/0109958 A1 | 4/2021 | Behtash |
| 2021/0125382 A1* | 4/2021 | Solovykh ................ G06T 13/20 |
| 2021/0133288 A1 | 5/2021 | Baughman |
| 2021/0133562 A1 | 5/2021 | Hong |
| 2021/0149979 A1 | 5/2021 | Nagarjuna |
| 2021/0151055 A1 | 5/2021 | Huitric |
| 2021/0157861 A1 | 5/2021 | Katzman |
| 2021/0158209 A1 | 5/2021 | Xiang |
| 2021/0173529 A1 | 6/2021 | Mostaert |
| 2021/0174208 A1 | 6/2021 | Margaglia |
| 2021/0182798 A1 | 6/2021 | Bikumala |
| 2021/0192412 A1 | 6/2021 | Krishnaswamy |
| 2021/0194888 A1 | 6/2021 | Bhaskar S |
| 2021/0256160 A1 | 8/2021 | Hachey |
| 2021/0258160 A1 | 9/2021 | Mostaert |
| 2021/0286476 A1 | 9/2021 | Mostaert |
| 2021/0303641 A1 | 9/2021 | Sekar |
| 2021/0319007 A1 | 10/2021 | Guggilla |
| 2021/0327018 A1 | 10/2021 | Carranza |

FOREIGN PATENT DOCUMENTS

| | | |
|---|---|---|
| WO | WO2012166581 A2 | 12/2012 |
| WO | WO2021161492 A1 | 8/2021 |

OTHER PUBLICATIONS

Lewandowski, D. Is Google responsible for providing fair and unbiased results?. In The responsibilities of online service providers (pp. 61-77). Springer, Cham. Feb. 2017.

Lewandowski, D. Living in a world of biased search engines. Online Information Review. 2015.

Erenli, K., Geminn, C., & Pfeiffer, L. (2021). Legal challenges of an open web index. International Cybersecurity Law Review, 2(1), 183-194, Mar. 16, 2021.

Fabos, B. The commercial search engine industry and alternatives to the oligopoly. Eastbound, 1, 187-200. 2006.

Argenton, C., & Prüfer, J. Search engine competition with network externalities. Journal of Competition Law and Economics, 8(1), 73-105. 2012.

Fabos, B. Search engine anatomy: The industry and its commercial structure. Cybraries. Mahwah, NJ: Erlbaum. 2006.

Singh, A., Web Access for Visually Impaired, Apr./May 2020.

Rossi, S. Developing Accessible Banking Services For visually impaired customers. May 29, 2020.

Frug, S., & Bruce, T. Artificial Intelligence and Accessibility for Administrative Applications. 2019.

Reid, B. E. Internet Architecture and Disability. Ind. LJ, 95, 591. 2020.

Forbes, M. R. Experiences of using intelligent virtual assistants by visually impaired students in online higher education. University of South Florida. Oct. 2019.

Legal fiction, Retrieved from Internet, Retrieved on Nov. 7, 2021.

Dev, Gowri. Property Law and Unborn: The Legal Fiction and The Property Rights. International Journal of Legal Science and Innovation. 2020.

Smith, Peter J. New Legal Fictions, George Washington University Law School, 2007.

Abbott, Ryan Benjamin and Sarch, Alex F., Punishing Artificial Intelligence: Legal Fiction or Science Fiction, Feb. 1, 2019.

Hildebrandt, Mireille. Law for Computer Scientists and Other Folk. Oxford Scholarship Online. Jul. 2020.

Dremliuga, R., Kuznetcov, P., & Mamychev, A. Criteria for Recognition of AI as a Legal Person. J. Pol. & L., 12, 105. Aug. 20, 2019.

Migle Laukyte. AI as a Legal Person. In Proceedings of the Seventeenth International Conference on Artificial Intelligence and Law. pp. 209-213. Jun. 17, 2019.

Koo, Stefan. Artificial Intelligence—Science Fiction and Legal Reality. Malaysian Journal of Syariah and Law. vol. 8 No. 2, Dec. 2018.

Dremliuga, R., Kuznetcov, P., & Marnychev, A. Criteria for Recognition of AI as a Legal Person. J. Pol. & L., 12, 105. 2019.

Smith, P. J. New legal fictions. Geo. LJ, 95, 1435. 2007.

Carroll, K. Smart Cars are Getting Smarter: Legal Personhood for Self-Driving Vehicles. 2021.

Jaynes, T. L. Legal personhood for artificial intelligence: citizenship as the exception to the rule. AI & Society, 35(2), 343-354. Jun. 2019.

Brown, R. D. Property ownership and the legal personhood of artificial intelligence. Information & Communications Technology Law, 30(2), 208-234. Dec. 2020.

Engel, D., & Malone, T. Measuring Collective Intelligence in Human-Machine Systems. Massachusetts Inst of Tech Cambridge. 2013.

Nolte, H., & Andersson, C. Internet of Speaking Things: A survey about opinions on smart speakers. 2021.

Ba, W., Mendelson, H., & Zhu, M. Sales Policies for a Virtual Assistant. Available at SSRN 3718080. 2020.

Freiknecht, J. Procedural content generation for games. 2021.

Ramamoorthy, A., & Yampolskiy, R. Beyond mad? the race for artificial general intelligence. 2018.

Baum, S. A survey of artificial general intelligence projects for ethics, risk, and policy. Global Catastrophic Risk Institute Working Paper, 17-1. 2017.

Naudé, W., & Dimitri, N. The race for an artificial general intelligence: implications for public policy. AI & Society, 35(2), 367-379. 2020.

Schmidhuber, J. Gödel machines: self-referential universal problem solvers making provably optimal self-improvements. 2003.

Shevlin, H., Vold, K., Crosby, M., & Halina, M. The limits of machine intelligence: Despite progress in machine intelligence, artificial general intelligence is still a major challenge. EMBO reports, 2019.

McLean, S., Read, G. J., Thompson, J., Baber, C., Stanton, N. A., & Salmon, P. M. The risks associated with Artificial General Intelligence: A systematic review. Journal of Experimental & Theoretical Artificial Intelligence, Aug. 1-15, 2021.

(56) References Cited

OTHER PUBLICATIONS

Chauhan, K. Virtual Assistant: A Review. International Journal of Research in Engineering, Science and Management, 3(7), 138-140. Jul. 2020.
Floridi, L., & Chiriatti, M. GPT-3: Its nature, scope, limits, and consequences. Minds and Machines, 30(4), 681-694. 2020.
Akbar, N. A., Darmayanti, I., Fati, S. M., & Muneer, A. Deep Learning of a Pre-trained Language Model's Joke Classifier Using GPT-2. Journal of Hunan University Natural Sciences, 48(8). Aug. 2021.
Vig, J., & Belinkov, Y. Analyzing the structure of attention in a transformer language model. Jun. 2019.
Topal, M. O., Bas, A., & van Heerden, I. Exploring transformers in natural language generation. 2021.
Salazar, J., Liang, D., Nguyen, T. Q., & Kirchhoff, K. Masked language model scoring. Jan. 2021.
Tsuruoka, Y. Deep learning and natural language processing. Brain Nerve, 71(1), 45-55. 2019.
Liu, J., Shen, D., Zhang, Y., Dolan, B., Carin, L., & Chen, W. What Makes Good In-Context Examples for GPT-$3 $?. Jan. 2021.
Liu, X., Zheng, Y., Du, Z., Ding, M., Qian, Y., Yang, Z., & Tang, J. GPT Understands, Too. Mar. 2021.
Lee, J. S., & Hsiang, J. Patent classification by fine-tuning BERT language model. World Patent Information, 61, 101965. Jun. 2020.
Bjöörn, A. Employing a Transformer Language Model for Information Retrieval and Document Classification: Using OpenAI's generative pre-trained transformer, GPT-2. Jul. 2020.
Ma, T. How Has Deep Learning Revolutionized Human Language Technology?. In 2020 IEEE Signal Processing in Medicine and Biology Symposium (SPMB) (pp. 1-2). IEEE. Dec. 2020.
Nugroho, K. S., & Yudistira, N. Large-Scale News Classification using BERT Language Model: Spark NLP Approach. 2021.
Bień, M., Gilski, M., Maciejewska, M., & Taisner, W. Cooking recipes generator utilizing a deep learning-based language model. Feb. 2020.
Zhang, H. Transfer training from smaller language model. Apr. 2021.
Li, K., Liu, Z., He, T., Huang, H., Peng, F., Povey, D., & Khudanpur, S. An empirical study of transformer-based neural language model adaptation. In ICASSP 2020-2020 IEEE International Conference on Acoustics, Speech and Signal Processing (ICASSP) (pp. 7934-7938). IEEE. May 2020.
Desai, V. P., & Oza, K. S. Fine Tuning Modeling Through Open AI. Jun. 2021.
Sarzhan, N. Modeling of complex phenomena and networks by machine learning. Dec. 2020.
Musk, E. Processing limitations on Enterprise AI-Is GPT-3 the ultimate solution?. 2021.
Carlini, N., Tramer, F., Wallace, E., Jagielski, M., Herbert-Voss, A., Lee, K., . . . & Raffel, C. Extracting training data from large language models. Jun. 2021.
Sakamoto, T., & Aizawa, A. Predicting Numerals in Natural Language Text Using a Language Model Considering the Quantitative Aspects of Numerals. In Proceedings of Deep Learning Inside Out (DeeLIO): The 2nd Workshop on Knowledge Extraction and Integration for Deep Learning Architectures (pp. 140-150). Jun. 2021.
Gautam, S. Design and Development of a Machine Learning Based Focused Crawler For Information Retrieval. Aug. 2019.
Šulák, B. L. Detection of Malicious Websites Using Machine Learning. 2018.
Xu, H., Fan, G., & Li, K. Analysis and Research of Distributed Network Crawler based on Cloud Computing Hadoop Platform. 2018.
Pais, S., Cordeiro, J., & Jamil, M. Hultig-C: NLP Corpus and Services in the Cloud. Jul. 2021.
Fejfar, P. Interactive web crawling and data extraction. 2018.
Freire, J., Krishnamurthy, Y., Pham, K., Santos, A., & Quispe, S. Towards Locating and Exploring Hard-to-Find Information on the Web. New York University New York United States. Sep. 2018.
Kim, Y. A., Kim, G. H., Kim, H. J., & Kim, C. G. Design and Implemention of Real-time web Crawling distributed monitoring system Journal of Convergence for Information Technology, 9(1), 45-53. 2019.
Ali, A., Ali, R., Khatak, A. M., & Aslam, M. S. Large scale image dataset construction using distributed crawling with hadoop YARN. In 2018 Joint 10th International Conference on Soft Computing and Intelligent Systems (SCIS) and 19th International Symposium on Advanced Intelligent Systems (ISIS) (pp. 394-399). IEEE. Dec. 2018.
Gontar, Y. M., Tkach, K. V., Yena, B. O., & Vasylenko, A. V. Towards information system development for data extraction from web. Вісник Національного технічного університету «ХпI». Серія: Системний аналіз, управління га інформаційні технології, , (22), 53-59. 2018.
Khare, R., Cutting, D., Sitaker, K., & Rifkin, A. Nutch: A flexible and scalable open-source web search engine. Oregon State University, 1, 32-32. 2004.
Cafarella, M., & Cutting, D. Building Nutch: Open Source Search: A case study in writing an open source search engine. Queue, 2(2), 54-61. 2004.
Lopez, L. A., Duerr, R., & Khalsa, S. J. S. Optimizing apache nutch for domain specific crawling at large scale. In 2015 IEEE International Conference on Big Data (Big Data) (pp. 1967-1971). IEEE. Oct. 2015.
Nagel, S. Web crawling with Apache Nutch. ApacheCon EU. 2014.
Michael, M., Moreira, J. E., Shiloach, D., & Wisniewski, R. W. Scale-up x scale-out: A case study using nutch/lucene. In 2007 IEEE International Parallel and Distributed Processing Symposium (pp. 1-8). IEEE. Mar. 2007.
Yu, J. I. A. N. K. U. N., Li, M., & Zhang, D. A distributed web crawler model based on cloud computing. In 2nd Information Technology and Mechatronics Engineering Conference (pp. 276-279). May 2016.
Fetzer, C., Felber, P., Rivière, É., Schiavoni, V., & Sutra, P. Unicrawl: A practical geographically distributed web crawler. In 2015 IEEE 8th International Conference on Cloud Computing (pp. 389-396). IEEE. Jun. 2015.
Shafiq, H. M., & Mehmood, M. A. NCL-Crawl: A large scale language-specific Web crawling system. Language & Technology, 79. 2020.
Giles, C. L., Sun, Y., & Councill, I. G. Measuring the web crawler ethics. In Proceedings of the 19th international conference on World wide web (pp. 1101-1102). Apr. 2010.
Wan, Y., & Tong, H. (Apr. 2008). URL assignment algorithm of crawler in distributed system based on hash. In 2008 IEEE International Conference on Networking, Sensing and Control (pp. 1632-1635). IEEE. May 2008.
Gossen, G., Demidova, E., & Risse, T. iCrawl: Improving the freshness of web collections by integrating social web and focused web crawling. In Proceedings of the 15th ACM/IEEE-CS Joint Conference on Digital Libraries (pp. 75-84). Jun. 2015.
Donovan, M. J. A Web Crawler for Automated Document Retrieval in Health Policy (Master's thesis). Jul. 2021.
Hsieh, J. M., Gribble, S. D., & Levy, H. M. The Architecture and Implementation of an Extensible Web Crawler. In NSDI (vol. 10, pp. 28-30). Apr. 2010.
Tan, M., & Lan, H. Analysis and Improvement of Chinese Index Technology of Open Source Search Engine Nutch. In Journal of Physics: Conference Series (vol. 1176, No. 2, p. 022032). Mar. 2019.
Alkalbani, A., Shenoy, A., Hussain, F. K., Hussain, O. K., & Xiang, Y. Design and implementation of the hadoop-based crawler for saas service discovery. In 2015 IEEE 29th International Conference on Advanced Information Networking and Applications (pp. 785-790). IEEE. Mar. 2015.
Kim, H., Byun, J., Na, Y., & Jung, Y. Implementation of Efficient Distributed Crawler through Stepwise Crawling Node Allocation. Journal of Advanced Information Technology and Convergence, 10(2), 15-31. Dec. 2020.
Menshchikov, A. A., Komarova, A. V., Gatchin, Y. A., Kalinkina, M. E., Tkalich, V. L., & Pirozhnikova, O. I. Modeling the behavior of

(56) References Cited

OTHER PUBLICATIONS web crawlers on a web resource. In Journal of Physics: Conference Series (vol. 1679, No. 3, p. 032043). Nov. 2020.
Barman, A. K., Sarmah, J., & Sarma, S. K. Developing Assamese Information Retrieval System Considering NLP Techniques: an attempt for a low resourced language. ADBU Journal of Engineering Technology, 8(2).
Krishna, T. G., & Sunit, K. V. N. Reviewed Study on Novel Search Mechanism for Web Mining. International Journal on Future Revolution in Computer Science & Communication Engineering, 4(1), 109-112. 2018.
Bartussek, W. Building concise text corpora from web contents. In Semantic applications (pp. 95-109). Springer Vieweg, Berlin, Heidelberg. 2018.
Xu, H., Zhao, B., & Fan, G. Analysis and Design of Improved Intelligent Search Strategy for Web Crawler. In 2018 8th International Conference on Mechatronics, Computer and Education Informationization (MCEI 2018) (pp. 214-218). Jun. 2018.
Wang, X., Xia, X., & Wei, X. Research and design of education vertical search engine based on Ontology. In 2nd International Forum on Management, Education and Information Technology Application (IFMEITA 2017) (pp. 127-132). Feb. 2018.
De Almeida, J. N. M. 2Gather4Health: Web Crawling and Indexing System Implementation. 2018.
Englund, M., Gullberg, C., & Wiklund, J. A web crawler to effectively find web shops built with a specific e-commerce plug-in. Jun. 2017.
Taghipour, M., Aboutorabi, F., Zarrabi, V., & Asghari, H. An Integrated Text Mining Platform for Monitoring of Persian News Agencies. Natural Language Processing meets Journalism III, 6. 2018.
Pais, S., Cordeiro, J., Martins, R., & Albardeiro, M. Socialnetcrawler: online social network crawler. In Proceedings of the 11th International Conference on Management of Digital EcoSystems (pp. 16-22). Nov. 2019.
Panchenko, A., Ruppert, E., Faralli, S., Ponzetto, S. P., & Biemann, C. Building a web-scale dependency-parsed corpus from commoncrawl. Feb. 2018.
Röder12, M., de Souza, G., Kuchelev, D., & Amer, A. ORCA—a Benchmark for Data Web Crawlers. Dec. 2019.
Dumbacher, B., & Diamond, L. K. SABLE: Tools for web crawling, web scraping, and text classification. In Federal committee on statistical methodology research conference. Mar. 2018.
Fotedar, S., Vannisselroij, K., Khalil, S., & Ploeg, B. Storytelling AI: A Generative Approach to Story Narration. In AI4Narratives@ IJCAI (pp. 19-22). 2020.
Tuncer, S. The Future of Storytelling in the Age of AI and Posthuman. 2020.
Yeo, H. D., & Kang, H. K. A Case Study on the Effect of the Artificial Intelligence Storytelling (AI+ ST) Learning Method. Journal of The Korean Association of Information Education, 24(5), 495-509. Oct. 2020.
Chen, S. Authorial Leverage: Artificial Intelligence for Narrative and Storytelling (Doctoral dissertation, UC Santa Cruz). 2021.
Chotisarn, N., Pimanmassuriya, W., & Gulyanon, S. Deep Learning Visualization for Underspecification Analysis in Product Design Matching Model Development. IEEE Access. Aug. 2021.
Hermann, I. Artificial intelligence in fiction: between narratives and metaphors. AI & Society, Oct. 1-11, 2021.
Magnani, M., & Montesi, D. (2004). A unified approach to structured, semistructured and unstructured data. University of Bologna, Department of Computer Science, Tech. Rep, 9, 2004.
Li, G., Ooi, B. C., Feng, J., Wang, J., & Zhou, L. (Jun. 2008). Ease: an effective 3-in-1 keyword search method for unstructured, semistructured and structured data. In Proceedings of the 2008 ACM SIGMOD international conference on Management of data (pp. 903-914).
Rusu, O., Halcu, I., Grigoriu, O., Neculoiu, G., Sandulescu, V., Marinescu, M., & Marinescu, V. (Jan. 2013). Converting unstructured and semi-structured data into knowledge. In 2013 11th RoEduNet International Conference (pp. 1-4). IEEE.
Buneman, P. (May 1997). Semistructured data. In Proceedings of the sixteenth ACM SIGACT-SIGMOD-SIGART symposium on Principles of database systems (pp. 117-121).
Sint, R., Schaffert, S., Stroka, S., & Ferstl, R. (Jun. 2009). Combining unstructured, fully structured and semi-structured information in semantic wikis. In CEUR Workshop Proceedings (vol. 464, pp. 73-87).
Balalau, O., Galhardas, H., Manolescu, I., Merabti, T., You, J., & Youssef, Y. (2020). Graph integration of structured, semistructured and unstructured data for data journalism, 2007.
Atzeni, P., Mecca, G., & Merialdo, P. (1997). Semistructured and structured data in the web: Going back and forth. ACM Sigmod Record, 26(4), 16-23.
Zaman, G., Mahdin, H., Hussain, K., & Rahman, A. (2020). Information extraction from semi and unstructured data sources: A systematic literature review. ICIC Express Lett., 14(6), 593-603.
Miller, L. L., Honavar, V., & Barta, T. (Nov. 1997). Warehousing structured and unstructured data for data mining. In Proceedings of the Annual Meeting-American Society for Information Science (vol. 34, pp. 215-224).
Chakraborty, S., & Chaki, N. (2011). A survey on the semistructured data models. In Computer Information Systems-Analysis and Technologies (pp. 257-266). Springer, Berlin, Heidelberg.
Fotedar, S et al. Storytelling AI: A Generative Approach to Story Narration, AI4Narratives@IJCAI, 2020.
Wikipedia, Gordon Pask, Sep. 1, 2021.
Wikipedia, Storytelling, Sep. 8, 2021.
Hsin-Yuan Huang, Eunsol Choi, Wen-tau Yih, FlowQA: Grasping Flow in History for Conversational Machine Comprehension. ICLR (Poster) 2019.
Jadeja, Mahipal and Varia, Neelanshi, Perspectives for Evaluating Conversational AI, arXiv:1709.04734, 2017.
Gupta, Somil & Rawat, Bhanu, Conversational Machine Comprehension: a Literature Review, 2020.
Medler, B. and Brian Magerko. "Scribe: A Tool for Authoring Event Driven Interactive Drama." TIDSE (2006).
Humble J. and Joanne Molesky, "DevOps: A Software Revolution in the Making" Clutter IT Journal, vol. 24. No. 8 (2011).
Jackson Freeman, CAIML®—Conversational Artificial Intelligence and Machine Learning, Fourth Industrial Systems, Oct. 2021.
Amazon, AWS Activate Portfolio, Oct. 19, 2021.
Microsoft, jericho—A lightweight python-based interface connecting learning agents with interactive fiction games. Retrieved from Github, Oct. 2, 2018.
Microsoft, TextWorld, Retrieved from Github, Nov. 13, 2020.
Urbanek et al., LIGHT—Learning in Interactive Games with Humans and Text, Retrieved from Internet, 2019 <URL: https://parl.ai/projects/light/>.
Osborne et al., A Survey of Text Games for Reinforcement Learning Informed By Natural Language, University of Manchester UK, Sep. 2021.
Ammanabrolu et al., Transfer in Deep Reinforcement Learning using Knowledge Graphs, EMNLP 2019, Aug. 19, 2019.
Murugesan et al., Eye of the Beholder: Improved Relation Generalization for Text-based Reinforcement Learning Agents, Jun. 15, 2021.
Guo, Xiaoxiao & Yu, Mo & Gao, Yupeng & Gan, Chuang & Campbell, Murray & Chang, Shiyu. Interactive Fiction Game Playing as Multi-Paragraph Reading Comprehension with Reinforcement Learning. 7755-7765. 10.18653/v1/2020.emnlp-main.624. Oct. 5, 2020.
Ammanabrolu, Prithviraj & Riedl, Mark. Situated Language Learning via Interactive Narratives. Mar. 18, 2021.
Yao, S., Rao, R., Hausknecht, M., & Narasimhan, K. Keep CALM and explore: Language models for action generation in text-based games. Oct. 6, 2020.
Ammanabrolu, P., & Riedl, M. O, Modeling Worlds in Text, Jun. 17, 2021.
Petrache, T. A., Rebedea, T., & Trăuşan-Matu, Ş. Interactive language learning—How to explore complex environments using natural language?, Jan. 2020.

(56) References Cited

OTHER PUBLICATIONS

Jansen, P. A, A Systematic Survey of Text Worlds as Embodied Natural Language Environments, Jul. 8, 2021.

Shridhar, M., Yuan, X., Cote, M. A., Bisk, Y., Trischler, A., & Hausknecht, M, ALFWorld: Aligning text and embodied environments for interactive learning, Mar. 14, 2021.

Jang, Y., Seo, S., Lee, J., & Kim, K. E., Monte-Carlo Planning and Learning with Language Action Value Estimates, In International Conference on Learning Representations, Sep. 2020.

Fan, A., Urbanek, J., Ringshia, P., Dinan, E., Qian, E., Karamcheti, S., & Weston, J, Generating interactive worlds with text. In Proceedings of the AAAI Conference on Artificial Intelligence, vol. 34, No. 02, pp. 1693-1700, Apr. 2020.

Osborn, J. C., Summerville, A., & Mateas, M. Automated game design learning. In 2017 IEEE Conference on Computational Intelligence and Games (CIG) (pp. 240-247). IEEE. Jul. 2017.

Yao, S., Narasimhan, K., & Hausknecht, M. Reading and Acting while Blindfolded: The Need for Semantics in Text Game Agents. Apr. 2021.

Zelinka, M. Baselines for reinforcement learning in text games. In 2018 IEEE 30th International Conference on Tools with Artificial Intelligence (ICTAI) (pp. 320-327). IEEE. Nov. 2018.

Yin, X., & May, J. Comprehensible context-driven text game playing. In 2019 IEEE Conference on Games (CoG) (pp. 1-8). IEEE. Aug. 2019.

Osborne, P., Nõmm, H., & Freitas, A. A Survey of Text Games for Reinforcement Learning informed by Natural Language. Sep. 2021.

Yin, X., & May, J. (2020). Zero-Shot Learning of Text Adventure Games with Sentence-Level Semantics. Apr. 2020.

Adhikari, A., Yuan, X., Côté, M. A., Zelinka, M., Rondeau, M. A., Laroche, R., . . . & Hamilton, W. Learning dynamic belief graphs to generalize on text-based games. Advances in Neural Information Processing Systems, 2020.

Côté, M. A., Kádár, A., Yuan, X., Kybartas, B., Barnes, T., Fine, E., . . . & Trischler, A. Textworld: A learning environment for text-based games. In Workshop on Computer Games (pp. 41-75). Springer, Cham. Jul. 2018.

Zelinka, M. Using reinforcement learning to learn how to play text-based games. Jan. 2018.

Ciolino, M., Kalin, J., & Noever, D. The Go Transformer: Natural Language Modeling for Game Play. In 2020 Third International Conference on Artificial Intelligence for Industries (AI4I) (pp. 23-26). IEEE. Sep. 2020.

Xu, Y., Fang, M., Chen, L., Du, Y., & Zhang, C. Generalization in Text-based Games via Hierarchical Reinforcement Learning. Sep. 2021.

Hausknecht, M., Ammanabrolu, P., Côté, M. A., & Yuan, X. Interactive fiction games: A colossal adventure. In Proceedings of the AAAI Conference on Artificial Intelligence (vol. 34, No. 05, pp. 7903-7910). Apr. 2020.

Osborn, J. C., Summerville, A., & Mateas, M. Automated game design learning. In 2017 IEEE Conference on Computational Intelligence and Games (CIG) (pp. 240-247). IEEE. Aug. 2017.

Miyagawa, S., Zeldes, A., Büchler, M., Behlmer, H., & Griffitts, T. Building Linguistically and Intertextually Tagged Coptic Corpora with Open Source Tools. Apr. 2019.

He, J. (2017). Deep reinforcement learning in natural language scenarios (Doctoral dissertation), 2017.

Bachman, P., Sordoni, A., & Trischler, A. Towards information-seeking agents. Dec. 2016.

78 AI Companies Around The World That Are Unicorns Today, Retrieved from Internet, Retrieved on Oct. 25, 2021.

\* cited by examiner

METHODS, SYSTEMS, APPARATUSES, AND DEVICES FOR FACILITATING FOR GENERATION OF AN INTERACTIVE STORY BASED ON NON-INTERACTIVE DATA

The current application claims a priority to the U.S. provisional patent application Ser. No. 63/021,154 filed on May 7, 2020.

FIELD OF THE INVENTION

Generally, the present disclosure relates to the field of data processing. More specifically, the present disclosure relates to methods, systems, apparatuses, and devices for facilitating generation of an interactive story based on non-interactive data, the system may include.

BACKGROUND OF THE INVENTION

The World Wide Web needs to be accessible to the disabled population, which comprises a significant number of people worldwide. Accessibility design can allow websites to be accessed by users who are visually impaired, hearing-impaired, motorically-impaired, or cognitively impaired. Difficulties encountered by such users when accessing a web site are many and include the inability to view or hear content, difficulty in typing or moving a mouse, and the inability to differentiate between colors. Accessibility challenges are intensified in Web 2.0 scenarios, as users may not produce accessible content. Various web accessibility standards have been established to aid web developers in producing accessible web pages and content. Such standards include W3C Web Content Accessibility Guidelines versions 1.0 and 2.0 (WCAG 1.0 and WCAG 2.0), U.S. Section 508 of the Rehabilitation Act of 1973 (Section 508), and those set forth in the Disability Discrimination Acts of Australia and the United Kingdom (DDA Australia, DDA UK).

Existing techniques for facilitating generation of an interactive story based on non-interactive data are deficient with regard to several aspects. For instance, current technologies do not generate an interactive story from non-interactive data. Furthermore, current technologies do not generate responses for requests made in relation to the interactive story. Moreover, current technologies do not generate an interactive story that enhances web accessibility.

Therefore, there is a need for improved methods, systems, apparatuses, and devices for facilitating generation of an interactive story based on non-interactive data, the system may include that may overcome one or more of the above-mentioned problems and/or limitations.

BRIEF SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating generation of an interactive story based on non-interactive data, in accordance with some embodiments. Accordingly, the method may include a step of receiving, using a communication device, at least one non-interactive data from at least one source device. Further, the method may include a step of analyzing, using a processing device, the at least one non-interactive data. Further, the method may include a step of generating, using the processing device, the at least one interactive story data based on the analyzing of the at least one non-interactive data. Further, the method may include a step of transmitting, using the communication device, the at least one interactive story data to at least one user device. Further, the method may include a step of receiving, using the communication device, at least one request associated with the at least one interactive story data from the at least one user device. Further, the method may include a step of analyzing, using the processing device, the at least one request. Further, the method may include a step of generating, using the processing device, at least one response based on the analyzing of the at least one interactive story data and the analyzing of the at least one request. Further, the method may include a step of transmitting, using the communication device, the at least one response associated with the at least one request to the at least one user device. Further, the method may include a step of storing, using a storage device, at least one of the at least one non-interactive data, the at least one interactive story data, the at least one request, and the at least one response.

Further disclosed herein is a system for facilitating generation of an interactive story based on non-interactive data, in accordance with some embodiments. Accordingly, the system may include a communication device, a processing device, and a storage device. Further, the communication device may be configured for receiving at least one non-interactive data from at least one source device. Further, the communication device may be configured for transmitting at least one interactive story data to at least one user device. Further, the communication device may be configured for receiving at least one request associated with the at least one interactive story data from the at least one user device. Further, the communication device may be configured for transmitting at least one response associated with the at least one request to the at least one user device. Further, the processing device may be configured for analyzing the at least one non-interactive data. Further, the processing device may be configured for generating the at least one interactive story data based on the analyzing of the at least one non-interactive data. Further, the processing device may be configured for analyzing the at least one request. Further, the processing device may be configured for generating the at least one response based on the analyzing of the at least one interactive story data and the analyzing of the at least one request. Further, the storage device may be configured for storing at least one of the at least one non-interactive data, the at least one interactive story data, the at least one request, and the at least one response.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
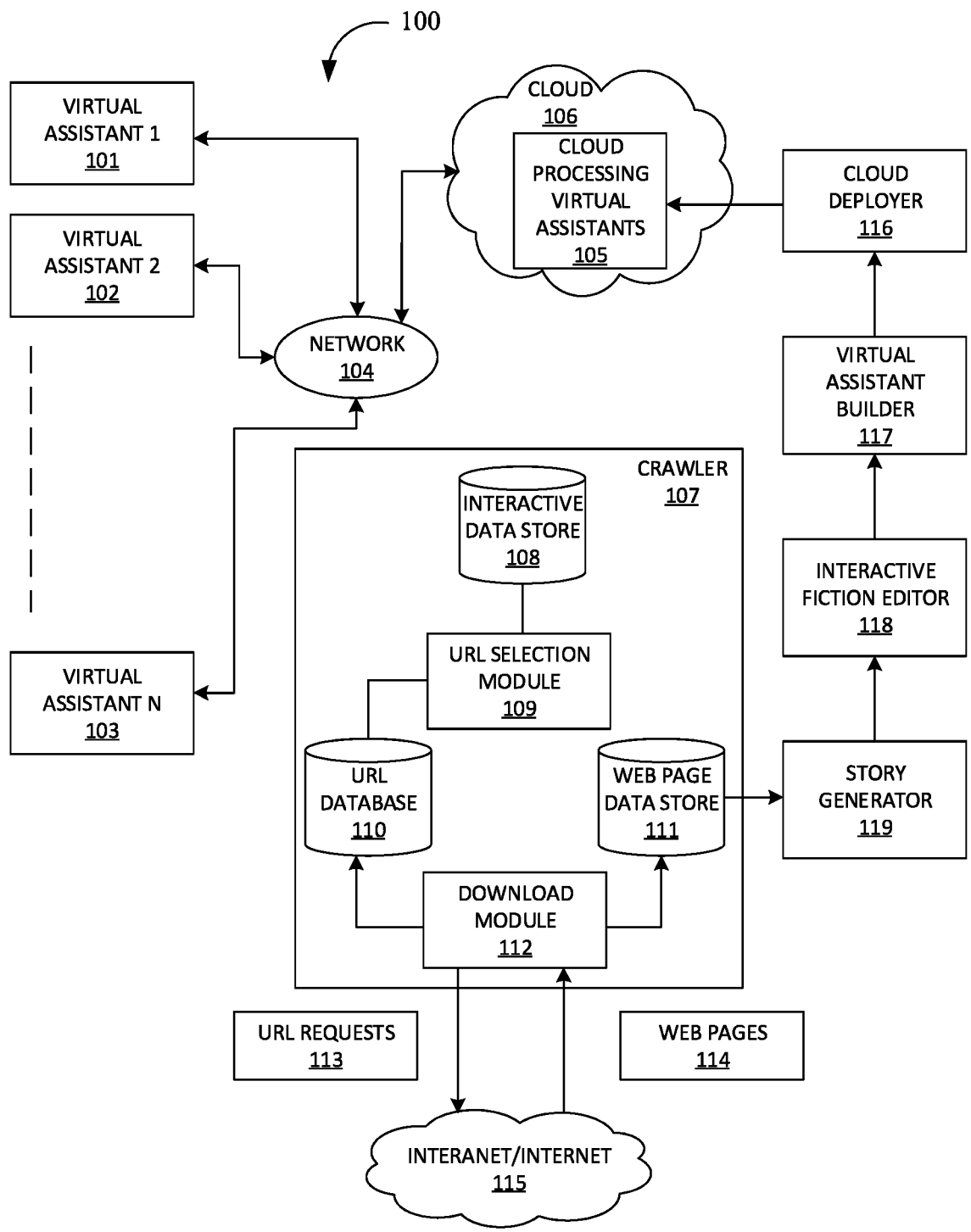
FIG. 1 is a block diagram of a system for creating virtual assistants, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating generation of an interactive story based on non-interactive data, the system may include, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled, and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating generation of an interactive story based on non-interactive data.

The present disclosure describes an improved data processing system. More specifically, the present disclosure describes an apparatus and method for providing web accessibility services. As the ADA becomes widely applied to Internet Web sites and other online properties, accessibility to these Internet Web sites, by persons having a different set of abilities becomes mandated by law. Online service providers and electronic businesses (e-businesses) need help in meeting these requirements and ensuring that they serve all their customers. As Web sites begin to differentiate themselves based on service, online businesses that offer services tailored to the customer's needs are more likely to be favored by customers with disabilities, or customers with a different set of abilities, than those Web sites that do not offer such tailored service. Until now, the industry has focused on designing shrink-wrapped client-side accessibility solutions ranging from screen-readers to self-voicing Web browsers like IBM Home Page Reader™ (HPR), IBM Home Page Reader™ is an IBM product that turns Internet Explorer into a talking browser. Selling shrink-wrapped solutions like HPR into the support-intensive accessibility market at an affordable price is a difficult proposition. Products like IBM's Via Voice™, which uses speech recognition to type documents, for example, may be very helpful to people that cannot move or are otherwise unable to use a keyboard because Via Voice™ is relatively cheap, and the market of persons having special needs is relatively small when compared to the overall market, selling the Via Voice™ application to mobile-impaired users as a client end product is not a profitable venture. For this reason, companies that sell speech recognition products are not given an incentive to market their products to a relatively small market of mobile-impaired users. Thus, it would be beneficial to have an apparatus and method for providing accessibility products to persons having special needs that are both relatively cheap for the end-user as well as profitable for the supplier of the accessibility product. Web accessibility is the inclusive practice of ensuring there are no barriers that prevent interaction with, or access to websites, by people with disabilities. When sites are correctly designed, developed, and edited, generally all users have equal access to information and functionality. For example, when a site is coded with semantically meaningful HTML, with textual equivalents provided for images and with links named meaningfully, this helps blind users using text-to-speech software and/or text-to-Braille hardware. When text and images are large and/or enlargeable, it is easier for users with poor sight to read and understand the content. When links are underlined (or otherwise differentiated) as well as colored, this ensures that color blind users will be able to notice them. When clickable links and areas are large, this helps users who cannot control a mouse with precision. When pages are not coded in a way that hinders navigation by means of the keyboard alone, or a single switch access device alone, this helps users who cannot use a mouse or even a standard keyboard. When videos are closed captioned or a sign language version is available, deaf and hard-of-hearing users can understand the video. When flashing effects are avoided or made optional, users prone to seizures caused by these effects are not put at risk. And when content is written in plain language and illustrated with instructional diagrams and animations, users with dyslexia and learning difficulties are better able to understand the content. When sites are correctly built and maintained, all of these users can be accommodated without decreasing the usability of the site for non-disabled users. The needs that Web accessibility aims to address include: Visual: Visual impairments including blindness, various common types of low vision and poor eyesight, various types of color blindness; Motor/mobility: e.g. difficulty or inability to use the hands, including tremors, muscle slowness, loss of fine muscle control, etc., due to conditions such as Parkinson's disease, muscular dystrophy, cerebral palsy, stroke; Auditory: Deafness or hearing impairments, including individuals who are hard of hearing; Seizures: Photo epileptic seizures caused by visual strobe or flashing effects. Cognitive and intellectual: Developmental disabilities, learning difficulties (dyslexia, dyscalculia, etc.), and cognitive disabilities of various origins, affecting memory, attention, developmental "maturity", problem-solving and logic skills, etc.

Further, the present disclosure describes tools and techniques that estimate web accessibility assessment and remediation efforts. In one embodiment, a user can indicate web accessibility standards against which a web site is to be checked. Standard test effort estimates for the individual indicated standards that are calculated based on test factors associated with individual guidelines comprising the standards. The standard test effort estimates are added to generate an estimate of the total amount of test time for testing one web page, a total standard test effort estimate. A total test effort estimate is determined based on the total standard test effort estimate and a number of web pages within the web site. A web accessibility assessment and remediation effort estimate is calculated based on the total test effort estimate.

In another embodiment, a user can select individual guidelines or sub-guidelines within the accessibility standards for inclusion in the standard test effort estimates. In yet another embodiment, a user can select which sub-guidelines to include in standard test effort estimates by selecting priority or success criteria levels associated with the individual sub-guidelines.

In some embodiments, the number of web pages within a web site can be broken down by complexity (e.g., simple, medium, complex). The total test effort estimate can account for varying web page complexities by scaling the total standard test estimate for the accessibility standards accordingly. The number of web pages can be determined manually by a user or automatically by a web crawler software application.

Further, the present disclosure describes a system for creating virtual assistants between a crawler and a cloud computer system (hereinafter referred to as a virtual assistant automation system). The crawler may operate as part of the virtual assistant on the cloud computer system. Further, the cloud computer system may be based on an Infrastructure as a Service (IaaS), a Platform as a Service (PaaS), a Software as a Service (SaaS), a Mobile "backend" as a service (MBaaS), a Serverless computing model, etc.

Further, in some embodiments, the cloud may offer an increasing virtual assistant automation system abstraction. Further, the virtual assistant automation system may be portrayed as layers in a stack, such as an infrastructure, a platform, and a software-as-a-service. Further, the layers may not be related. For example, one may provide SaaS implemented on physical machines (bare metal), without using underlying PaaS or IaaS layers, and conversely, one may run a program on IaaS and access it directly, without wrapping it as SaaS.

Further, a Virtual Assistant Server is a cloud based computer program or a device that provides functionality for Virtual Assistant programs or devices, called "clients". Virtual Assistant Server can provide various conversation functionalities such as sharing data or resources among multiple Virtual Assistant clients or performing computation for a client. A single server can serve multiple clients, and a single client can use multiple servers. A client process may run on the same device or may connect over a network to a server on a different device. Typical servers are database servers, file servers, mail servers, print servers, web servers, game servers, and application servers. Client-server systems are today most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components Further, the present disclosure describes a contact center system. Further, the contact center system may be operated by a third-party service provider. According to another embodiment, the contact center system may operate as a hybrid system in which some components of the contact center system are hosted at the contact center premise, and other components are hosted remotely (e.g., in a cloud-based environment). The contact center system may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device. Further details in this regard are disclosed in U.S. Pat. No. 9,992,338, the contents of which are incorporated herein by reference, in its entirety.

Further, the present disclosure describes the usage of Serverless computing for facilitating the generation of the interactive story. Further, Cloud computing types may include a Public cloud, a Hybrid cloud, a Community cloud, a Distributed cloud, a Multicloud, a Big Data cloud, an HPC cloud, etc.

Further, the present disclosure describes the usage of a contact user system for facilitating the generation of the interactive story. Further, the contact center system may be operated by a third-party service provider. According to another embodiment, the contact center system may operate as a hybrid system in which some components of the contact center system are hosted at the contact center premise, and other components are hosted remotely (e.g., in a cloud-based environment). The contact center system may be deployed in equipment dedicated to the enterprise or third-party service provider, and/or deployed in a remote computing environment such as for example, a private or public cloud environment with infrastructure for supporting multiple contact centers for multiple enterprises. The various components of the contact center may also be distributed across various geographic locations and computing environments and not necessarily contained in a single location, computing environment, or even computing device.

Further, the present disclosure describes the usage of a story generator for facilitating the generation of the interactive story. Further, the story generator creates an XML file compatible as input to an Interactive Fiction Editor. The Interactive Fiction Editor is an authoring tool dedicated to the description of narrative elements composing an interactive fiction. It also automatizes the exchange of information between writers and production teams.

Further, the present disclosure describes an architecture in which a virtual assistant team may be implemented. The architecture includes one or more smart devices (hereinafter "the smart device") to present the virtual assistant team to one or more end-users (hereinafter "the user") to perform tasks for the user. The virtual assistant team may be implemented in cooperation with a virtual assistant service that generally manages access to and/or functionality associated with the virtual assistant team. As the virtual assistant team performs tasks, the virtual assistant team may communicate with one or more service providers (hereinafter "the service provider"). The architecture also includes a virtual assistant trainer community to train virtual assistants to be provided end-users, such as the user. Further details in this regard are disclosed in U.S. Pat. No. 9,830,044, the contents of which are incorporated herein by reference, in its entirety.

Further, the present disclosure may describe the importing of the xml data into an AIML chatbot. Further, the xml data may be obtained from a variety of sources. Movie and TV transcripts may be used to help create chatbots that simulate movie and TV characters. Scripts may be written directly for the purpose of creating AIML content. The advantage is that any writer who is familiar with the character can write a script, and the writer does not need to know the intricacies of AIML. The writer can just write the script, and convert the script to AIML. A Transcript comprises a new set of input/ response sentences to be used in Training the New Bot. The inputs from the transcripts are canonicalized with the reduction and matched against the patterns to find a matching pattern. An AIML template is then created by associating the response sentence to the matching pattern. The reductions, matched patterns, and templates are put together to form an AIML New Bot.

Further, a virtual assistant is a software agent that can perform tasks or services for an individual. Sometimes the term "chatbot" is used to refer to virtual assistants generally or specifically those accessed by online chat (or in some cases online chat programs that are for entertainment and not useful purposes). Further, the capabilities and usage of virtual assistants are expanding rapidly, with new products entering the market and a strong emphasis on voice user interfaces. Virtual assistants make work via Text (online chat), especially in an instant messaging app or other app and Voice, by taking and/or uploading images. Some virtual assistants are accessible via multiple methods.

Further, the Virtual assistants use natural language processing (NLP) to match user text or voice input to executable commands Many Virtual assistants continually learn using artificial intelligence techniques including machine learning. To activate a virtual assistant using the voice, a wake word might be used. Further, the Virtual assistants may be integrated into many types of platforms or across several of the platforms. Further, Virtual assistants may be integrated into devices like smart speakers. Further, the Virtual assistants may be integrated into instant messaging apps on both smartphones and via the Web. Further, Virtual assistants may be built into a mobile operating system (OS). Further, the Virtual assistants may be built into a smartphone independent of the OS. Further, Virtual assistants may be integrated within instant messaging platforms. Further, Virtual assistants may be integrated into mobile apps from specific companies and other organizations. Further, the Virtual assistants may be integrated On smartwatches. Further, Virtual assistants may be integrated into appliances, cars, and clothing. Further, the Virtual assistants may be integrated conversational commerce is e-commerce via various means of messaging, including via voice assistants but also live chat on e-commerce Web sites, live chat on messaging apps, and chatbots on messaging apps or Web sites.

Further, a computer network, or data network, is a digital telecommunications network that allows nodes to share resources. In computer networks, computing devices exchange data with each other using connections (data links) between nodes. These data links are established over cable media such as wires or optic cables, or wireless media such as WiFi. Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. In most cases, application-specific communications protocols are layered (i.e. carried as payload) over other more general communications protocols. This formidable collection of information technology requires skilled network management to keep it all running reliably. Computer networks support an enormous number of applications and services such as access to the World Wide Web, digital video, digital audio, shared use of application and storage servers, printers, and fax machines, and use of email and instant messaging applications as well as many others. Computer networks differ in the transmission medium used to carry their signals, communications protocols to organize network traffic, the networks size, topology, traffic control mechanism, and organizational intent. The best-known computer network is the Internet.

Further, the cloud processing virtual assistants may be associated with service models, Infrastructure as a service (IaaS), Platform as a service (PaaS), Software as a service (SaaS), Mobile "backend" as a service (MBaaS), Serverless computing, Function as a service (FaaS), etc.

Further, cloud computing is shared pools of configurable computer system resources and higher-level services that can be rapidly provisioned with minimal management effort, often over the Internet. Cloud computing relies on the sharing of resources to achieve coherence and economies of scale, similar to a public utility. Third-party clouds enable organizations to focus on their core businesses instead of expending resources on computer infrastructure and maintenance. Further, the cloud computing allows companies to avoid or minimize up-front IT infrastructure costs. Proponents also claim that cloud computing allows enterprises to get their applications up and running faster, with improved manageability and less maintenance, and that it enables IT teams to more rapidly adjust resources to meet fluctuating and unpredictable demand Cloud providers typically use a "pay-as-you-go" model, which can lead to unexpected operating expenses if administrators are not familiarized with cloud-pricing models. The availability of high-capacity networks, low-cost computers, and storage devices as well as the widespread adoption of hardware virtualization, service-oriented architecture, and autonomic and utility computing has led to growth in cloud computing.

Further, a Web crawler, sometimes called a spider or a spiderbot and often shortened to crawler, is an Internet bot that systematically browses the World Wide Web, typically for the purpose of Web indexing (web spidering). Web search engines and some other sites use Web crawling or spidering software to update their web content or indices of other sites' web content. Web crawlers copy pages for processing by a search engine which indexes the downloaded pages so users can search more efficiently. Crawlers consume resources on visited systems and often visit sites without approval. Issues of schedule, load, and "politeness" come into play when large collections of pages are accessed. Mechanisms exist for public sites not wishing to be crawled to make this known to the crawling agent. For example, including a robots.txt file can request bots to index only parts of a website or nothing at all. The number of Internet pages is extremely large; even the largest crawlers fall short of making a complete index. For this reason, search engines struggled to give relevant search results in the early years of the World Wide Web. Today, relevant results are given almost instantly. Crawlers can validate hyperlinks and HTML code. They can also be used for web scraping (see also data-driven programming).

Further, the present disclosure describes an interactive data store. Further, the interactive data store may be a data store. Further, the data store is a repository for persistently storing and managing collections of data which include not just repositories like databases, but also simpler store types such as simple files, emails, etc. A database is a series of bytes that is managed by a database management system (DBMS). A file is a series of bytes that is managed by a file system. Thus, any database or file is a series of bytes that, once stored, is called a data store. MATLAB and Cloud Storage systems like VMware, Firefox OS use datastore as a term for abstracting collections of data inside their respective applications.

Further, the present disclosure describes an URL Selection Module. Further, the URL Selection Module may include a Uniform Resource Locator (URL). Further, the URL may be colloquially termed as a web address that is a reference to a web resource that specifies its location on a computer network and a mechanism or retrieving it. A URL is a specific type of Uniform Resource Identifier (URI), although many people use the two terms interchangeably. Further, URLs occur most commonly to reference web pages (http) but are also used for file transfer (ftp), email (mailto), database access (JDBC), and many other applications. Most web browsers display the URL of a web page above the page in an address bar. A typical URL could have the form http://www.example.com/index.html, which indicates a protocol (http), a hostname (www.example.com), and a file name (index.html).

Further, the present disclosure describes web pages. Further, the web pages may include a web page. Further, the web page (also written as webpage) is a document that is suitable for the World Wide Web and web browsers. A web browser displays a web page on a monitor or mobile device. The web page usually means what is visible, but the term may also refer to a computer file, usually written in HTML or a comparable markup language. Web browsers coordinate various web resource elements for the written web page, such as style sheets, scripts, and images, to present the web page. Typical web pages provide hypertext that includes a navigation bar or a sidebar menu linking to other web pages via hyperlinks, often referred to as links. On a network, a web browser can retrieve a web page from a remote web server. The web server may restrict access to a private network such as a corporate intranet. The web browser uses the Hypertext Transfer Protocol (HTTP) to make such requests to the web server. A static web page is delivered exactly as stored, as web content in the web server's file system. In contrast, a dynamic web page is generated by a web application, usually driven by server-side software. Dynamic web pages help the browser (the client) to enhance the web page through user input to the server.

Further, the present disclosure describes the receiving of information through the intranet/internet. An intranet is a private network accessible only to an organization's staff. Often, a wide range of information and services are available on an organization's internal intranet that is unavailable to the public, unlike the Internet. A company-wide intranet can constitute an important focal point of internal communication and collaboration, and provide a single starting point to access internal and external resources. In its simplest form, an intranet is established with the technologies for local area networks (LANs) and wide area networks (WANs). Intranets began to appear in a range of larger organizations from 1994.

Further, the present disclosure describes an Interactive Fiction Editor. Interactive fiction, often abbreviated IF, is software simulating environments in which players use text commands to control characters and influence the environment. Works in this form can be understood as literary narratives, either in the form of Interactive narratives or Interactive narrations. These works can also be understood as a form of video game, either in the form of an adventure game or role-playing game. In common usage, the term refers to text adventures, a type of adventure game where the entire interface can be "text-only", however, graphical text adventure games, where the text is accompanied by graphics (still images, animations, or video) still fall under the text adventure category if the main way to interact with the game is by typing text. Some users of the term distinguish between interactive fiction, known as "Puzzle-free", that focuses on narrative, and "text adventures" that focus on puzzles. Due to their text-only nature, they sidestepped the problem of writing for widely divergent graphics architectures. This feature meant that interactive fiction games were easily ported across all the popular platforms at the time, including CP/M (not known for gaming or strong graphics capabilities). The number of interactive fiction works is increasing steadily as new ones are produced by an online community, using freely available development systems. The term can also be used to refer to digital versions of literary works that are not read in a linear fashion, known as gamebooks, where the reader is instead given choices at different points in the text; these decisions determine the flow and outcome of the story. The most famous example of this form of printed fiction is the Choose Your Own Adventure book series, and the collaborative "adventure" format has also been described as a form of interactive fiction. The term "interactive fiction" is sometimes used also to refer to visual novels, a type of interactive narrative software popular in Japan.

Further, the present disclosure describes the usage of a Text corpus for facilitating the generation of the interactive story. In linguistics, a corpus (plural corpora) or text corpus is a large and structured set of texts (nowadays usually electronically stored and processed). In corpus linguistics, they are used to do statistical analysis and hypothesis testing, checking occurrences or validating linguistic rules within a specific language territory. A corpus may contain texts in a single language (monolingual corpus) or text data in multiple languages (multilingual corpus). Multilingual corpora that have been specially formatted for side-by-side comparison are called aligned parallel corpora. There are two main types of parallel corpora that contain texts in two languages. In a translation corpus, the texts in one language are translations of texts in the other language. In a comparable corpus, the texts are of the same kind and cover the same content, but they are not translations of each other. To exploit a parallel text, some kind of text alignment identifying equivalent text segments (phrases or sentences) is a prerequisite for analysis. Machine translation algorithms for translating between two languages are often trained using parallel fragments comprising a first language corpus and a second language corpus which is an element-for-element translation of the first language corpus. In order to make the corpora more useful for doing linguistic research, they are often subjected to a process known as an annotation. An example of annotating a corpus is part-of-speech tagging, or POS-tagging, in which information about each word's part of speech (verb, noun, adjective, etc.) is added to the corpus in the form of tags. Another example is indicating the lemma (base) form of each word. When the language of the corpus is not a working language of the researchers who use it, interlinear glossing is used to make the annotation bilingual. Some corpora have further structured levels of analysis applied. In particular, a number of smaller corpora may be fully parsed. Such corpora are usually called Treebanks or Parsed Corpora. The difficulty of ensuring that the entire corpus is completely and consistently annotated means that these corpora are usually smaller, containing around one to three million words. Other levels of linguistic structured analysis are possible, including annotations for morphology, semantics, and pragmatics. Corpora are the main knowledge base in corpus linguistics. The analysis and processing of various types of corpora are also the subject of much work in computational linguistics, speech recognition, and machine translation, where they are often used to create hidden Markov models for part of speech tagging and other purposes. Corpora and frequency lists derived from them are useful for language teaching. Corpora can be considered as a type of foreign language writing aid as the contextualised grammatical knowledge acquired by non-native language users through exposure to authentic texts in corpora allows learners to grasp the manner of sentence formation in the target language, enabling effective writing. Further details in this regard are disclosed on the webpage https://en.wikipedia.org/wiki/Text_corpus, the contents of which are incorporated herein by reference, in its entirety.

Further, the present disclosure describes the usage of Web Text Corpus for Natural Language Processing. Web text has been successfully used as training data for many NLP applications. While most previous work accesses web text through search engine hit counts, a Web Corpus may be created by downloading web pages to create a topic-diverse collection of 10 billion words of English. Further, for context-sensitive spelling correction, the Web Corpus results are better than using a search engine. For thesaurus extraction, it achieved similar overall results to a corpus of newspaper text. With many more words available on the web, better results can be obtained by collecting much larger web corpora Further, the present disclosure describes the creating of an interactive drama. Further, creating the interactive drama requires authors to produce large quantities of story content. A programmer or knowledge expert typically creates this content because they have experience with the story environment. By using an authoring tool someone with less experience with the story environment can organize and create story content. The Scribe Authoring Tool is an authoring tool that will be used to create interactive dramas. The tool will follow certain requirements to make it relevant to any story environment and will be usable enough for someone not familiar with the environment to author story content for interactive dramas. The author creates the setting, characters, and situation which the narrative must address, but the user (also reader or player) experiences a unique story based on their interactions with the story world. The architecture of an interactive storytelling program includes a drama manager, user model, and agent model to control, respectively, aspects of narrative production, player uniqueness, and character knowledge and behavior. Together, these systems generate characters that act "human," alter the world in real-time reactions to the player, and ensure that new narrative events unfold comprehensibly. Most authoring tools are made for a specific game environment or story setting. While these tools are efficient in their specific domain, they are not well suited for the varying and dynamic storytelling environments that are needed for interactive drama. A more general tool could be reused across environments and story contexts rather than reinventing a new tool. Debugging becomes extremely difficult when dealing with interactive dramas due to a large amount of content that they use. Interactive drama users are able to play through many different possible storylines. Content must be produced in large quantities with complex relationships between the various parts to allow for these variable storylines. With this larger structure comes an increase in the number of possible problems in both the system behavior and the authored content, such as poor decision making by the intelligent agent coordinating the story, redundancy in the storyline, continuity problems, or dead ends that could affect the user experience. It is difficult for the author to play through a large interactive drama fixing errors as they play each storyline possibility. Debugging of this content is typically done through playtesting the experience and observing if the correct behavior occurs. An authoring tool could help facilitate this process by decoupling the real time experience of an interactive drama from the authored story content and agent behavior. By allowing debugging inside of an authoring tool, the author will save time by not having to switch into the story environment and will be able to play through the story quicker, with various story navigation options. Further details in this regard are disclosed in research paper Medler, B. and Brian Magerko. "*Scribe: A Tool for Authoring Event Driven Interactive Drama.*" *TIDSE* (2006) (https://pdfs.semanticscholar.org/3079/6a195137e9b4ae25efed09429f82bb8f5e5f.pdf), the contents of which are incorporated herein by reference, in its entirety.

Further, the present disclosure describes Virtual Assistant B Developer platforms. The platforms that power the most widely used virtual assistants are also used to power other solutions.

Further, the present disclosure describes the usage of DevOps for facilitating the generation of the interactive story. Further, DevOps is about aligning the incentives of everybody involved in delivering software, with a particular emphasis on developers, testers, and operations personnel. A fundamental assumption of DevOps is that achieving both frequent, reliable deployments and a stable production environment is not a zero-sum game. DevOps is an approach to fixing the first three problems listed above through culture, automation, measurement, and sharing. Further details in this regard are disclosed in research paper Humble J. and Joanne Molesky, "*DevOps: A Software Revolution in the Making*" *Clutter IT Journal*, Vol 24. No. 8 (2011), https://www.uio.no/studier/emner/matnat/ifi/ITLED4021/h18/dokumentasjon/devops-cutter-journal-2011.pdf#page=6, the contents of which are incorporated herein by reference, in its entirety.

Further, the present disclosure describes a cloud deployer. Further, the cloud deployer may be associated with Deployment models and Cloud computing types. Further, a private cloud is a cloud infrastructure operated solely for a single organization, whether managed internally or by a third party, and hosted either internally or externally. Undertaking a private cloud project requires significant engagement to virtualize the business environment, and requires the organization to reevaluate decisions about existing resources. It can improve business, but every step in the project raises security issues that must be addressed to prevent serious vulnerabilities. Self-run data centers are generally capital intensive. They have a significant physical footprint, requiring allocations of space, hardware, and environmental controls. These assets have to be refreshed periodically, resulting in additional capital expenditures. They have attracted criticism because users "still have to buy, build, and manage them" and thus do not benefit from less hands-on management, essentially "[lacking] the economic model that makes cloud computing such an intriguing concept". Further, a public cloud is a cloud is where the services are rendered over a network that is open for public use. Public cloud services may be free. Technically there may be little or no difference between public and private cloud architecture, however, security consideration may be substantially different for services (applications, storage, and other resources) that are made available by a service provider for a public audience and when communication is effected over a non-trusted network. Generally, public cloud service providers like Amazon Web Services (AWS™), Oracle™, Microsoft™, and Google™ own and operate the infrastructure at their data center and access is generally via the Internet. AWS, Oracle, Microsoft, and Google also offer direct connect services called "AWS Direct Connect", "Oracle FastConnect", "Azure ExpressRoute", and "Cloud Interconnect" respectively, such connections require customers to purchase or lease a private connection to a peering point offered by the cloud provider. Further, a Hybrid cloud is a composition of two or more clouds (private, community, or public) that remain distinct entities but are bound together, offering the benefits of multiple deployment models. The Hybrid cloud can also mean the ability to connect collocation, managed, and/or dedicated services with cloud resources. Gartner defines a hybrid cloud service as a cloud computing service that is composed of some combination of private, public, and community cloud services, from different service providers. A hybrid cloud service crosses isolation and provider boundaries so that it can't be simply put in one category of private, public, or community cloud service. It allows one to extend either the capacity or the capability of a cloud service, by aggregation, integration, or customization with another cloud service. Varied use cases for hybrid cloud composition exist. For example, an organization may store sensitive client data in a house on a private cloud application, but interconnect that application to a business intelligence application provided on a public cloud as a software service. This example of a hybrid cloud extends the capabilities of the enterprise to deliver a specific business service through the addition of externally available public cloud services. Hybrid cloud adoption depends on a number of factors such as data security and compliance requirements, level of control needed over data, and the applications an organization uses. Another example of a hybrid cloud is one where IT organizations use public cloud computing resources to meet temporary capacity needs that can not be met by the private cloud. This capability enables hybrid clouds to employ cloud bursting for scaling across clouds. Cloud bursting is an application deployment model in which an application runs in a private cloud or data center and "bursts" to a public cloud when the demand for computing capacity increases. A primary advantage of cloud bursting and a hybrid cloud model is that an organization pays for extra computing resources only when they are needed. Cloud bursting enables data centers to create an in-house IT infrastructure that supports average workloads, and use cloud resources from public or private clouds, during spikes in processing demands. The specialized model of hybrid cloud, which is built atop heterogeneous hardware, is called "Cross-platform Hybrid Cloud". A cross-platform hybrid cloud is usually powered by different CPU architectures, for example, x86-64 and ARM, underneath. Users can transparently deploy and scale applications without knowledge of the cloud's hardware diversity. This kind of cloud emerges from the raise of ARM-based system-on-chip for server-class computing. Further, a Community cloud shares infrastructure between several organizations from a specific community with common concerns (security, compliance, jurisdiction, etc.), whether managed internally or by a third-party, and either hosted internally or externally. The costs are spread over fewer users than a public cloud (but more than a private cloud), so only some of the cost savings potential of cloud computing are realized. Further, a Distributed cloud is a cloud computing platform that can be assembled from a distributed set of machines in different locations, connected to a single network or hub service. It is possible to distinguish between two types of distributed clouds: public-resource computing and volunteer cloud. Public-resource computing is a type of distributed cloud results from an expansive definition of cloud computing because they are more akin to distributed computing than cloud computing. Nonetheless, it is considered a sub-class of cloud computing, and some examples include distributed computing platforms such as BOINC and Folding@Home. Volunteer cloud and Volunteer cloud computing are characterized as the intersection of public-resource computing and cloud computing, where a cloud computing infrastructure is built using volunteered resources. Many challenges arise from this type of infrastructure, because of the volatility of the resources used to built it and the dynamic environment it operates in. It can also be called peer-to-peer clouds, or ad-hoc clouds. An interesting effort in such direction is Cloud@Home, it aims to implement a cloud computing infrastructure using volunteered resources providing a business-model to incentivize contributions through financial restitution. Further, Multicloud is the use of multiple cloud computing services in a single heterogeneous architecture to reduce reliance on single vendors, increase flexibility through choice, mitigate against disasters, etc. It differs from hybrid cloud in that it refers to multiple cloud services, rather than multiple deployment modes (public, private, legacy). The issues of transferring large amounts of data to the cloud as well as data security once the data is in the cloud initially hampered the adoption of cloud for big data, but now that much data originates in the cloud and with the advent of bare-metal servers, the cloud has become a solution for use cases including business analytics and geospatial analysis. Further, an HPC cloud refers to the use of cloud computing services and infrastructure to execute high-performance computing (HPC) applications. These applications consume a considerable amount of computing power and memory and are traditionally executed on clusters of computers. Various vendors offer servers that can support the execution of these applications. In the HPC cloud, the deployment model allows all HPC resources to be inside the cloud provider infrastructure or different portions of HPC resources to be shared between the cloud provider and client on-premise infrastructure. The adoption of cloud to run HPC applications started mostly for applications composed of independent tasks with no inter-process communication. As cloud providers began to offer high-speed network technologies such as InfiniBand, multiprocessing tightly coupled applications started to benefit from cloud as well.

Further, the Cloud Deployer may be of type a public cloud, a hybrid cloud, a community cloud, a distributed cloud, a multi cloud, a big data cloud, or a high-performance computing cloud. Further, the Cloud Deployer may be of type private cloud that is operated solely for a single organization, whether managed internally or by a third party and hosted either internally or externally. Further, the Cloud Deployer may be of type public cloud where the cloud is rendered over a network that is open for public use.

Further, the virtual assistant server operating on the cloud computer system may include DevOps (a clipped compound of "development" and "operations"). In this case, the software development methodology may combine software development (Dev) with information technology operations (Ops). DevOps may be used to shorten the virtual assistant development life cycle while also delivering features, fixes, and updates frequently in close alignment with web accessibility objectives. DevOps provides a cross-functional mode of working with software tools. Such DevOps tools are expected to fit into one or more of these categories, reflective of key aspects of the development and delivery process.

Further, the story generator creates an XML file compatible as input to an Interactive Fiction Editor. The Interactive Fiction Editor is an authoring tool dedicated to the description of narrative elements composing an interactive fiction. It also automatizes the exchange of information between writers and production teams.

Further, the present disclosure describes a system and a method for providing a virtual assistant. Further, the virtual assistant may generate responses associated with requests based on an interactive story. Further, the system may include at least one computer-readable storage medium and at least one processor. Further, the at least one computer-readable storage medium may be configured to store a plurality of user profiles including a first user profile of a first user. Further, the first user profile may include information specifying a first virtual assistant persona. Further, the at least one processor may be coupled to the at least one computer-readable storage medium. Further, the at least one processor may be configured receiving a first request to access the first user profile from a first device of the first user. Further, the first device may be configured to execute a first virtual assistant to interact with the first user. Further, in response to receiving the first request, the at least one processor may be configured for providing the first device with access to at least some information in the first user profile, including the information specifying the first virtual assistant persona, such that the first virtual assistant may be configured to customize, based on the at least some accessed information, its behavior when interacting with the first user at least in part by adopting the first virtual assistant persona when interacting with the first user. Further, the information specifying the first virtual assistant persona may specify speech generation settings including a voice font and/or speaking style so that, when the first virtual assistant adopts the first virtual assistant persona, the first virtual assistant may be configured to generate speech using the voice font and/or speaking style of the speech generation settings when interacting with the first user. Further, after receiving the first request, the at least one processor may be configured for receiving a second request to access the first user profile from a second device of the first user, the second device may be configured to execute a second virtual assistant to interact with the first user, the second device may be different from the first device. Further, in response to receiving the second request, the at least one processor may be configured for providing the second device with access to the at least some information, including the information specifying the first virtual assistant persona, such that the second virtual assistant may be configured to customize, based on the at least some accessed information, its behavior when interacting with the first user at least in part by adopting the first virtual assistant persona when interacting with the first user. Further, when the second virtual assistant adopts the first virtual assistant persona, the second virtual assistant may be configured to generate speech using the voice font and/or speaking style of the speech generation settings when interacting with the first user. Further, the at least one processor may be configured for receiving, from the first device, information related to a task being performed at least in part by using the first device. Further, the at least one processor may be configured for determining whether performance of the task is to be continued at least in part by using the second device instead of the first device. Further, when it is determined that the performance of the task is to be continued at least in part by using the second device, the at least one processor may be configured for providing the second device with access to the received information. Further, the information related to the task being performed by the first device may specify what portion of the task has been performed by the first device. Further details in this regard are disclosed in U.S. Pat. No. 9,804,820, the contents of which are incorporated herein by reference, in its entirety.

Further, the present disclosure describes a method for generating an interactive story. Further, the method may include receiving, using a server via a network, a request for a customized story from a user device receiving personalization information relating to a user associated with the user device. Further, the method may include receiving localization information relating to a current location of the user device. Further, the method may include generating, using the server, the customized story based on the personalization information, and the localization information. Further, the customized story may include a plot and at least one character. Further, the method may include effecting an audible narration of the customized story over the network to the user device. Further, the method may include selecting, using the server, a human reader from a plurality of human readers. Further, the method may include sending, using the server, the customized story to a computer associated with the human reader. Further, the human reader audibly narrates the customized story in real-time over the network to the user device. Further, in an instance, the effecting of the audible narration of the customized story over the network to the user device may include providing, by a plurality of preselected human readers, a spoken reproduction of the customized story over the network to the user device. Further, each of the plurality of preselected human readers providing a portion of the spoken reproduction associated with a respective character in the customized story. Further, in an instance, the effecting of the audible narration of the customized story over the network to the user device may include providing, by the plurality of human readers, a spoken reproduction of the customized story over the network to a plurality of user devices. Further, each of the plurality of human readers providing a portion of the spoken reproduction associated with a respective character in the customized story. Further, at least one of the plurality of human readers is a user associated with one of the plurality of user devices. Further details in this regard are disclosed in U.S. Pat. No. 8,332,741, the contents of which are incorporated herein by reference, in its entirety.

Further, the present disclosure describes an apparatus configured for generating an interactive story. Further, the apparatus may include an information collection unit configured to collect log information comprising the daily life information from at least one electronic device. Further, the apparatus may include an analysis unit configured to analyze the log information collected from the information collection unit and decide at least one topic representing the daily life information. Further, the apparatus may include a story generator configured to generate at least one sentence representing the daily life information based on at least one of a reference topic representative of the daily life information decided by the analysis unit, weather, and an emotion. Further, the apparatus may include a display unit configured to display the at least one sentence generated by the story generator. Further, the at least one sentence may include the interactive story. Further, in an instance, the analysis unit may include a topic segment constructor configured to construct at least one topic segment comprising at least one candidate topic using the log information collected from the information collection unit. Further, the analysis unit may include an extractor configured to extract a sentence constituent element for constituting a sentence from each topic segment. Further, the analysis unit may include a topic decider configured to decide a topic for each topic segment based on a frequency of occurrence of a topic according to the sentence constituent element extracted in the extractor. Further, the analysis unit may include an episode decider configured to select one topic segment for a reference time based on the frequency of occurrence of a topic comprised in each topic segment. Further, in an instance, the story generator may be configured to construct at least one middle sentence using a sentence constituent element included in an episode being set at a reference time. Further, the story generator may be configured to remove a middle sentence of the same meaning. Further, the story generator may be configured to add sentence connective verb ending and ending verb information to the middle sentence. Further, the story generator may be configured to generate a sentence for the episode. Further details in this regard are disclosed in U.S. Pat. No. 8,892,555, the contents of which are incorporated herein by reference, in its entirety.

Further, the present disclosure describes artificial intelligence methods and systems for triggering the generation of narratives. Further, the generation of the narratives may include the generation of the interactive story. Further, the present disclosure describes the real-time evaluation and automated generation of narrative stories based on received data. For example, data can be tested against data representative of a plurality of story angles to determine whether a narrative story incorporating one or more such story angles is to be automatically generated. Further details in this regard are disclosed in U.S. Pat. No. 8,892,417, the contents of which are incorporated herein by reference, in its entirety.

Further, the present disclosure describes a method and an apparatus for an on-demand narration of a customized story. Further, the on-demand narration of the customized story may facilitate the generation of the interactive story. Further, a user may indicate a desire via a user device to listen to a narrated customized story. Further, a story service receives personalization information relating to the user associated with the user device. Further, the story service may obtain localization information relating to information associated with a location of the user device. Further, a customized story may be generated based on the personalization information and the localization information. Further, the customized story may be narrated to the user device. Further details in this regard are disclosed in U.S. Pat. No. 8,332,741, the contents of which are incorporated herein by reference, in its entirety.

Further, the present disclosure describes an apparatus, a method, and a computer program product for creating and executing a client workflow for web data extraction. Further, the web data extraction may facilitate the generation of the interactive story. Further, the present disclosure describes a system for facilitating web data extraction. Further, the system may include a data storage component configured for storing a plurality of preconfigured reusable software components that provide services for creating a client workflow for web data extraction. Further, the system may include a communication interface operable to receive workflow definitions from a client. Further, the workflow definitions may be used for creating the client workflow for web data extraction utilizing at least one of the plurality of preconfigured reusable software components. Further, the system may include a processor for executing instructions to run the client workflow for web data extraction. Further details in this regard are disclosed in U.S. Pat. No. 8,918,357, the contents of which are incorporated herein by reference, in its entirety.

Further, the present disclosure describes technologies for automatic domain model generation including a computing device that accesses an n-gram index of a web corpus. Further, the computing device may generate a semantic graph of the web corpus for a relevant domain using the n-gram index. Further, the semantic graph may include one or more related entities that may be related to a seed entity. Further, the computing device may be configured to perform similarity discovery to identify and rank contextual synonyms within the domain. Further, the computing device may maintain a domain model including intents representing actions in the domain and slots representing parameters of actions or entities in the domain. Further, the computing device may perform intent discovery to discover intents and intent patterns by analyzing the web corpus using the semantic graph. Further, the computing device may perform slot discovery to discover slots, slot patterns, and slot values by analyzing the web corpus using the semantic graph. Further details in this regard are disclosed in U.S. Pat. No. 9,886,950, the contents of which are incorporated herein by reference, in its entirety.

Further, the present disclosure describes computer systems and methods that may allow users to annotate content items found in a corpus such as the World Wide Web Annotations, which can include any descriptive and/or evaluative metadata related to a document, are collected from a user and stored in association with that user. Further, the users may interact with the corpus. Further, the users may annotate and view annotations for any document they encounter while interacting with the corpus, including hits returned in a search of the corpus. Further, the users may search the annotations or limit searches to documents they have annotated. Metadata from annotations may be aggregated across users and aggregated metadata applied in generating search results. Further details in this regard are disclosed in U.S. Pat. No. 9,984,164, the contents of which are incorporated herein by reference, in its entirety.

Further, the present disclosure describes a computer-implemented method for building a web corpus (WCD). Further, the method may include sending by a web crawler (WC) a query to a reference web crawl agent (RWCA). Further, the query may include a least one identifier of a resource. Further, the method may include receiving by the web crawler (WC) a response from the reference web crawl agent (RWCA). Further, if the response does not include the resource identified by the identifier, the method may include downloading by the web crawler (WC) the resource from the website (WS) corresponding to the identifier and adding the resource to the web corpus (WCD); and if the response may include the resource identified by the identifier, the method may include adding the resource to the web corpus (WCD). Further details in this regard are disclosed in U.S. Pat. No. 9,529,911, the contents of which are incorporated herein by reference, in its entirety.

Further, the present disclosure describes technologies for natural language request processing include a computing device having a semantic compiler to generate a semantic model based on a corpus of sample requests. Further, the semantic compiler may generate the semantic model by extracting contextual semantic features or processing ontologies. Further, the computing device may generate a semantic representation of a natural language request by generating a lattice of candidate alternative representations, assigning a composite weight to each candidate, and finding the best route through the lattice. Further, the composite weight may include semantic weights, phonetic weights, and/or linguistic weights. Further, the semantic representation may identify a user intent and slots associated with the natural language request. Further, the computing device may perform one or more dialog interactions based on the semantic request, including generating a request for additional information or suggesting additional user intents. Further, the computing device may support automated analysis and tuning to improve request processing. Further details in this regard are disclosed in U.S. Pat. No. 9,772,994, the contents of which are incorporated herein by reference, in its entirety.

Further, the present disclosure describes a method for tuning translation parameters in statistical machine translation based on the ranking of the translation parameters. Further, the method may include sampling pairs of candidate translation units from a set of candidate translation units corresponding to a source unit. Further, each candidate translation unit corresponding to numeric values assigned to one or more features. Further, the method may include receiving an initial weighting value for each feature. Further, the method may include comparing the pairs of candidate translation units to produce binary results and using the binary results to adjust the initial weighting values to produce modified weighting values. Further details in this regard are disclosed in U.S. Pat. No. 8,694,303, the contents of which are incorporated herein by reference, in its entirety.

Further, the present disclosure describes methods and systems for dynamically training a web crawler. Further, the web crawler may maintain one or more categories each of the one or more categories may include a set of words. Further, the method may include selecting at least one hyperlink in response to a query received from a user. Further, the method may include determining a hyperlink score for the at least one hyperlink based on a category score associated with each of the one or more categories. Further, the category score associated with each of the one or more categories may be updated based at least in part on the hyperlink score. Further, the updated category score may be compared with the hyperlink score to select a category from the one or more categories. Further, the set of words associated with the category may be updated based on the content of a web page pointed by the at least one hyperlink.

Further details in this regard are disclosed in U.S. Pat. No. 9,576,052, the contents of which are incorporated herein by reference, in its entirety.

Further, the present disclosure describes methods and systems that automate a DevOps deployment pipeline and optimize DevOps costs. Further, the methods may generate a deployment pipeline model based on policies associated with each deployment stage and task. Further, the methods may optimize the cost of the deployment pipeline model based on model combinations of VMs. Further, the deployment pipeline model may be executed on a cloud computing infrastructure to develop an application program. Further details in this regard are disclosed in U.S. Pat. No. 10,120,668, the contents of which are incorporated herein by reference, in its entirety.

Further, the present disclosure describes a visual DevOps application that recognizes the selection of a set of architectural resources, Further, at least one of the architectural resources may require two or more infrastructure resources to implement. Further, the visual DevOps application visually presents a set of architectural nodes representing the architectural resources in an architectural flow diagram. Further, the visual DevOps application maps the set of architectural nodes to a set of infrastructure resources sufficient to implement the set of architectural resources. Further, the visual DevOps may automatically provision the set of infrastructure resources on one or more infrastructure computers. Further details in this regard are disclosed in U.S. Pat. No. 10,089,082, the contents of which are incorporated herein by reference, in its entirety.

Further, the present disclosure describes a virtual assistant automation system. The virtual assistant automation system includes a virtual assistant team connected to a network through a cloud computer system. The network may be a global communication network, such as the Internet, or a private network, sometimes called an Intranet. Examples of a cloud computer system include public cloud, private, etc. The cloud computer system includes a virtual assistant server and includes a service known as a web crawler. It may also optionally include a DevOps. The virtual assistant server store web pages. The virtual assistant server provides the processing between web page data and virtual assistant clients. Each web crawler participating in the virtual assistant server maintains its own database of information and runs a server program that other systems across the Intranet or Internet can query. The domain name system provides the protocol that allows clients and servers to communicate with each other. Any application may look up the IP address (or addresses) corresponding to a given host name or the host name corresponding to a given IP address in the virtual assistant server. An application accesses the virtual assistant server through a resolver. The resolver contacts one or more name servers to perform a mapping of a host name to the corresponding IP address, or vice versa. A given host name may be associated with more than one IP address because an Intranet or Internet host may have multiple interfaces, with each interface of the host having a unique IP address. The DevOps includes an index of words used on the world wide web or the Intranet, and addresses of the web pages that use each word. Such indexing systems are maintained by various search engines, such as the AltaVista search engine. The virtual assistant server and the DevOps may be accessed by the web crawlers in the process of downloading web pages from the world wide web. The web crawler system is made up of n web crawlers, where n is an integer larger than one. A typical web crawler system may contain, for example, four web crawlers. The web crawlers in the web crawler system communicate via a communications network such as a local area network, or the Internet. In addition, there may be a separate computer (not shown) for controlling the communication between the web crawlers in the web crawler system.

Further, the web crawler includes one or more CPUs, a communications interface or network connection, memory. The web crawler may optionally include a user interface, or the web crawler may be accessed by a user interface or other facility remotely located on another computer. In some implementations two network connections or communication interfaces may be needed, one for downloading web documents, and another for communicating with the other web crawlers. The memory includes: an operating system; an Intranet/Internet access procedure for fetching web pages as well as communicating with the virtual assistant server; a frontier for storing URLs or representations of URLs that will be downloaded by the web crawler; threads for downloading web pages from the servers, and processing the downloaded web pages; a main web crawler procedure executed by each of the threads; a URL address distribution procedure executed by each of the threads to identify the URLs in a downloaded web page, and to determine which web crawler is associated with each URL; a web crawler lookup table for storing the addresses corresponding to the web crawler identifiers of the other web crawlers in the system; a URL address filter procedure executed by each of the threads to filter the URLs assigned to this web crawler for processing, and to determine which URLs are new and therefore should be scheduled for downloading; and data structures for storing all of the known addresses associated with the web crawler. The data structures for storing the known data set addresses may include: a buffer for storing the addresses (and/or fingerprints of addresses) identified as potentially being addresses unknown to the web crawler; an optional cache, for storing frequently encountered addresses; and a disk file (or set of disk files) for storing addresses (and/or fingerprints of addresses) known to the web crawler. While these are the data structures used in a preferred embodiment to store known data set addresses, and/or the fingerprints of those addresses, other data structures may be used to store this information in other embodiments. Further details in this regard are disclosed in U.S. Pat. No. 7,139,747, the contents of which are incorporated herein by reference, in its entirety.

Further, the present disclosure describes Main Web Crawler Procedure. Each web crawler uses multiple threads to download and process documents. The web crawler is given a set of initial URLs and begins downloading documents using those URLs. Various data structures may be used to keep track of which documents (web pages) the threads should download and process, but those particular data structures are not the subject of the present invention. Rather, the present invention concerns the methodology and data structures used to determine the URLs to be processed by each web crawler in the web crawler system. The web crawler thread determines the data set address of the next document, or data set, to be downloaded, typically by retrieving the data set address from the frontier. The frontier is a queue that stores the data set addresses (URLs) to be downloaded. The thread then downloads the document corresponding to the URL and processes the document. The processing may include indexing the words in the document so as to make the document accessible via a search engine. However, the only processing of the document that is relevant to the present discussion is that the main procedure identifies URLs in the downloaded document that are candidates for downloading and processing. Typically, these URLs are found in hypertext links in the document being processed. Each identified URL is passed to the address distribution procedure to determine which web crawler in the web crawler system should process the URL. If the address distribution procedure determines that the identified URL should not be processed by the web crawler running the procedure, the URL is sent to the appropriate web crawler for processing. In the meantime, the main procedure continues to identify URLs and pass URLs to the address distribution procedure until all URLs from the downloaded page have been processed. When all URLs have been passed to the address distribution procedure, the next address is retrieved from the frontier, and then the procedure described above repeats. The main web crawler procedure continues to run as long as there are URLs in the frontier for it to process, or until a predetermined stop condition occurs. Further details in this regard are disclosed in U.S. Pat. No. 7,139,747, the contents of which are incorporated herein by reference, in its entirety.

Further, the present disclosure describes an Address Distribution Procedure. Further, the address distribution procedure is invoked by the main web crawler procedure. It is preferable to assign URLs to each web crawler by hostname. Each web crawler is then responsible for processing only the addresses associated with its assigned set of hosts. Assigning all the URLs from each host to one particular web crawler makes it more practical to enforce "politeness" policies, which dictate restrictions on how often the web crawler system will download pages from any one host, and it avoids having to replicate per-host information across multiple web crawlers. The first step of the URL distribution procedure is to convert the part of the specified URL U that identifies the web page's host computer, called the host computer identifier, into a numeric representation H. In one embodiment, the "host computer identifier" is a symbolic name, such as "www.compaq.com," while in another embodiment, the "host computer identifier" is an IP address, such as 161.114.19.252. Which of these two embodiments is used determines the interpretation of "politeness." For instance, if the system distributes URLs based on symbolic host names, then it is possible that the web crawler system will distribute two different host names that happen to resolve to the same IP address to two different web crawlers, in which case those two web crawlers may send requests in parallel to the machine at that IP address. If the system distributes URLs based on the host IP address, only one web crawler will send requests to the host computer at that IP address. In the preferred embodiment, an intermediate value V is first produced by converting the host computer identifier into a fixed-length numeric representation, or "hash value." The hash value, also herein called the fingerprint, may be generated by applying a predefined hash function to the specified URL Us host computer identifier. The only requirement for the hash function is that it should spread the URLs evenly over the available hash buckets. Many suitable hash functions are known to those skilled in the art, including checksum functions and fingerprint functions, and thus are not described here. After the host identifier of the specified URL U has been converted into the intermediate value V, the web crawler generates the representation of the host computer identifier by computing a function of the host computer identifier whose result is an integer value that is a member of a set of n predefined distinct values, where n is the number of web crawlers in the web crawler system. For instance, the representation of the host computer identifier may be generated by computing V modulo n. The host computer representation H which is the result of computing V modulo n will be an integer between 0 and n−1. In alternate embodiments, other methods may be used to map the host identifier into a numerical representation H. One such alternative method is to divide the numeric range of all possible intermediate values V into n sub-ranges, where the range of values is preferably divided so as to evenly spread the possible values of V over the n sub-ranges. Each value V is then mapped to an integer between 0 and n−1 by determining which of the n sub-ranges it falls in. For instance, if the hash function used to generate V returns a value between 0 and X−1, the web crawler identifier may be computed as follows:

if $0 \leq V < (1/n)X$ then return 0
if $(1/n)X \leq V < (2/n)X$ then return 1
if $(2/n)X \leq V < (3/n)X$ then return 2
. . .
if $((n-1)/n)X \leq V < X$ then return n−1

After the host computer representation H has been generated, the address distribution procedure determines the web crawler identifier corresponding to H. In the preferred embodiment, each web crawler in the web crawler system is assigned a web crawler identifier W. The web crawler identifier may be an integer between zero and n−1, where n is the number of web crawlers in the web crawler system. Therefore, in this embodiment, the host computer representation H is equal to its corresponding web crawler identifier W. Other embodiments may include a procedure to map the host computer representation H to the web crawler identifier W to ensure an even distribution of URLs across the plurality of web crawlers. If the web crawler identifier W is assigned to the current web crawler (i.e., the web crawler running the address distribution procedure), then the URL U is passed to the address filter procedure, which is described below. If the web crawler identifier W is not assigned to the current web crawler, the URL U is sent to the destination web crawler corresponding to the web crawler identifier W. Other methods of generating a host computer representation and mapping it to the web crawler identifier such that there is an even spreading of host names (host computer identifiers) over the web crawlers in the web crawler system may be apparent to those skilled in the art. In order to send the URL U to the destination web crawler, the sending web crawler transmits the URL U to the destination web crawler at an address specified by the web crawler lookup table. The web crawler lookup table may be part of a configuration file used to determine the configuration of the web crawler during initialization of the system. In a preferred embodiment, during initialization of the web crawler system, each web crawler opens a connection to every other web crawler in the system, and thereafter transmits URLs to the other web crawlers over the open connections. The "open connections" are operating system or other software constructs that generate message packets that are sent to the destination web crawlers via the network connection. Each such message packet contains the information (e.g., a URL) being sent and has a destination address equal to the IP address of the web crawler to which the URL is being sent. Further details in this regard are disclosed in U.S. Pat. No. 7,139,747, the contents of which are incorporated herein by reference, in its entirety.

Further, the present disclosure describes an Address Filter Procedure. The address filter procedure receives URLs sent from other web crawlers and from the address distribution procedure as described above. The address filter procedure determines if the URL U is a duplicate URL that has already been downloaded by the web crawler or has already been scheduled for downloading. This is preferably done by comparing the URL to a list of all stored URLs that are known to the web crawler. The list of known URLs is stored in a set of data structures, described in more detail below, designed to facilitate efficient lookup. If the URL is a duplicate (Yes), it is discarded. If the URL is not a duplicate (No), it is added to the frontier for downloading by the web crawler and to the list of the addresses known to the web crawler. The data structures for the frontier and for the list of addresses known to the web crawler are described below. Further, the data structures may be used to determine whether the specified URL is a duplicate. Preferably, a fingerprint N is generated to represent the entire specified URL, not just the host computer identifier. Next, a lookup is performed to see if N is already stored in a buffer B, which stores the fingerprints of recently added URLs, as well as the corresponding URLs. If N is already stored in buffer B, it has already been scheduled for downloading, and therefore no further processing of the URL U is needed (i.e., the new copy of the URL U is discarded). If N is not stored in buffer B, it may be new (although it may already be stored in the fingerprint disk file), and therefore N and the corresponding URL U are added to buffer B. Other URLs are processed until buffer B is full. When the buffer B becomes full, it must be merged with the fingerprint disk file. The fingerprints in buffer B are first sorted so that the fingerprints are in order. After ordering, the buffer B is then merged with the fingerprint disk file, where only fingerprints corresponding to new URLs are added to the disk file. During the merge, the fingerprint disk file is searched to determine whether each fingerprint from buffer B is located in the disk file. Each fingerprint located in the disk file is discarded. Each fingerprint not located in the disk file is added to the disk file, and the corresponding URL is added to the frontier for downloading of the corresponding web page document. When the merge process is completed, the contents of buffer B are deleted. The process of merging buffer B into the disk file is a relatively time-consuming operation. Therefore buffer B is typically made fairly large so as to minimize the frequency of such merge operations. In this embodiment, buffer B and the disk file are the data structures used to store known addresses. During the merge process, which is an ordered merge, each fingerprint from buffer B not found in the disk file must be inserted in the fingerprint disk file in the proper location, so that the disk file remains ordered. This requires the disk file to be completely re-written. To avoid this lengthy rewrite process the fingerprint disk file may be sparsely-filled, using open addressing. For this embodiment, the fingerprint disk file represents a hash table, with a substantial proportion of the table, for example 50% or 75%, being empty entries or "holes." Further, in order to determine whether a fingerprint from buffer B is in the disk file, the hash of the fingerprint is computed. In one embodiment, a prefix of the fingerprint is used for the hash value. The hash value is the starting position for searching through the fingerprint disk file. The disk file is searched sequentially, starting at the starting position, for either a match or a hole. If a hole is found, the fingerprint from buffer B is stored in that hole; if a match is found, it is discarded. Thus, there is only one write to the disk file for each fingerprint not already present in the disk file, and the size of the disk file is not a factor in the merge time. When the disk file becomes too full for example, when only 25% of the slots in the disk file are holes the file must be completely rewritten into a new, larger file. For example, the new file may be doubled in size, in which case the amortized cost of maintaining the file is constant per fingerprint in the hash table. It will be appreciated that the use of a sparsely-filled disk file drastically reduces the disk re-writing required during a merge. In one embodiment, the disk file may be divided into sparse sub-files, with open-addressing used for each sub-file. An index may be used to identify the range of fingerprint hash values located in each sub-file, or an additional hash table may be used to map fingerprints to the various sub-files. When a sub-file becomes too full, it may be re-written into a new, larger file, but the entire disk file need not be re-written. The disk file (or each sub-file) is ordered so that all fingerprints from the same host will be likely stored in either the same sub-file or at contiguous memory locations within the disk file. Because URLs located on a given web page often have the same host, this efficient addressing scheme can significantly improve the speed of the merge process. When a new fingerprint is to be added to the disk file during the merge, often the buffer used for the merge operation will already contain the disk page on which that fingerprint will be stored. This will occur when the previous fingerprint added to the disk file was from the same host as the new fingerprint, and consequently would likely have been stored on the same disk page as the new fingerprint. In an alternative embodiment, in addition to buffer B, a cache C of "popular" URLs is included. Cache C, in this embodiment, is one of the data structures for storing known addresses. The fingerprint for each URL from the address distribution procedure or from another web crawler is first compared to fingerprints in cache C, to see whether the URL is a "popular" URL that has already been downloaded (or scheduled for downloading) and therefore need not be processed any further. If the fingerprint is not in cache C, the address filter then goes on to compare the fingerprint to the fingerprints in buffer B, as discussed previously. Use of the cache C significantly reduces the rate at which the buffer B is filled with fingerprints, which reduces the frequency of merges with the disk file and thus improves the efficiency of the address filter. The cache C is updated according to an update policy. When, according to the update policy, a new fingerprint must be added to cache C, and cache C is full, a fingerprint is evicted from cache C. The fingerprint to be evicted at any one time is determined using an appropriate eviction policy, such as a least recently used eviction policy, a round robin eviction policy or a clock replacement eviction policy. A new fingerprint is added to cache C according to an update policy. The following are examples of update policies. A fingerprint corresponding to a URL may be added to cache C, following the comparison of the fingerprint to the contents of cache C, whenever that fingerprint is not already contained in cache C. Thus, under this update policy, cache C is simply a cache of fingerprints for recently-identified URLs. Alternatively, a fingerprint may be added to cache C following the comparison of a fingerprint to the contents of buffer B whenever that fingerprint is not contained in cache C but is contained in buffer B. In this case, cache C is a cache of fingerprints for URLs which have been identified more than once recently. Or, a fingerprint may be added to cache C whenever that fingerprint is not contained in cache C and is not contained in buffer B. Cache C in this case is a cache of fingerprints of URLs that have been identified only once recently. Finally, a fingerprint may be added to cache C during the merge when the fingerprint is found to have been previously stored in the fingerprint disk file. For this policy, cache C is a cache of fingerprints of URLs that have been identified more than once during the entire web crawl. When buffer B is full, it must be merged with the fingerprint disk file, and cannot accept any newly-identified URLs. Hence, when using this embodiment, no new addresses can be accepted for filtering while the time-consuming merge process is in progress. To avoid delaying the address filtering procedure during the merge process, the address filter uses a second buffer B' in addition to the buffer B. In this embodiment, buffer B' is one of the data structures used to store known addresses. While buffer B is being merged with the disk file, buffer B' takes over the role of buffer B. Fingerprints for newly-identified URLs are compared with the contents of buffer B' and then stored in buffer B' if it is determined that the fingerprints are not already stored in buffer B'. When buffer B' is full, the two buffers change roles again. The addition of cache C makes use of the buffer B more efficient, while the use of two buffer B's greatly reduces the "cost" of the buffer merge operations in terms of the web crawler's ability to process discovered URLs that may or may not be new URLs. In yet another alternate embodiment, the list of known addresses is maintained in a hash table in the main memory (i.e., not on disk). This embodiment is useful primarily in systems used to crawl Intranets, but can also be used in web crawler systems where the cost of having a very large main memory (e.g., several gigabytes of random access memory) is economically worthwhile. The advantage of keeping the list of known addresses entirely in main memory is the speed of operation, while the disadvantage is cost. Further details in this regard are disclosed in U.S. Pat. No. 7,139,747, the contents of which are incorporated herein by reference, in its entirety.

The generation of an interactive story based on non-interactive data can be implemented as a computer program product that includes a computer program mechanism embedded in a computer-readable storage medium. For instance, the computer program product could contain the program modules. These program modules may be stored on a CD-ROM, magnetic disk storage product, or any other computer-readable data or program storage product. The software modules in the computer program product may also be distributed electronically, via the Internet or otherwise, by transmission of a computer data signal (in which the software modules are embedded) on a carrier wave.

Further, the present disclosure describes the creation of a virtual assistant, and more particularly to creating a virtual assistant using a web crawler and text corpus. A virtual assistant is a software agent that can perform tasks or services for an individual. Sometimes the term "chatbot" is used to refer to virtual assistants generally or specifically those accessed by online chat (or in some cases online chat programs that are for entertainment and not useful purposes). A web crawler sometimes called a spider or spiderbot and often shortened to crawler, is an Internet bot that systematically browses the World Wide Web, typically for the purpose of web indexing. In linguistics, a corpus (plural corpora) or text corpus is a large and structured set of texts. In corpus linguistics, they are used to do statistical analysis and hypothesis testing, checking occurrences or validating linguistic rules within a specific language territory. Web accessibility is the inclusive practice of ensuring there are no barriers that prevent interaction with, or access to websites, by people with disabilities. When sites are correctly designed, developed, and edited, generally all users have equal access to information and functionality.

Further, the present disclosure describes an improved virtual assistant automation system. More specifically, the present disclosure describes an apparatus and method for providing web accessibility services.

Further, the present disclosure describes systems and methods for automated virtual assistants.

Further, the present disclosure describes a novel virtual assistant content from a web crawler. A web crawler processes xml data into a story, so that a virtual assistant may be programmed to give the same responses when given similar stories. Each story is converted into passage data and then matched against patterns. The response is then linked to the matched pattern. A new chatbot is constructed out of the xml content conversions and the set of pattern-response links. The virtual assistant is further improved by adding an interactive fiction editor process. The resulting chatbot can run on a cloud computer that responds to user queries, and the cloud can also distribute context-sensitive virtual assistant.

Further, the present disclosure describes generating virtual assistant content from a web crawler, wherein the web crawler processes xml data into a story, so that a virtual assistant may be programmed to give the same responses when given similar stories, wherein each story is converted into passage data and then matched against patterns and the response is then linked to the matched pattern. Further, the virtual assistant may be improved by adding an interactive fiction editor process.

FIG. 1 is a block diagram of a system 100 for creating virtual assistants, in accordance with some embodiments. Further, the system 100 may include a plurality of virtual assistants 101-103, a network 104, a cloud processing virtual assistant 105, a cloud 106, a crawler 107, an interactive data store 108, an URL selection module 109, an URL database 110, a web page data store 111, a download module 112, URL requests 113, web pages 114, intranet/internet 115, a cloud deployer 116, a story generator 119, an interactive fiction editor 118, and a virtual assistant builder 117.

Further, the crawler 107 may extract XML data from the intranet/internet 115. Further, the XML data extracted by the crawler 107 may be stored in the web page data store 111. Further, the story generator 119 may extract the XML data from the web page data store 111.

Figure 2:
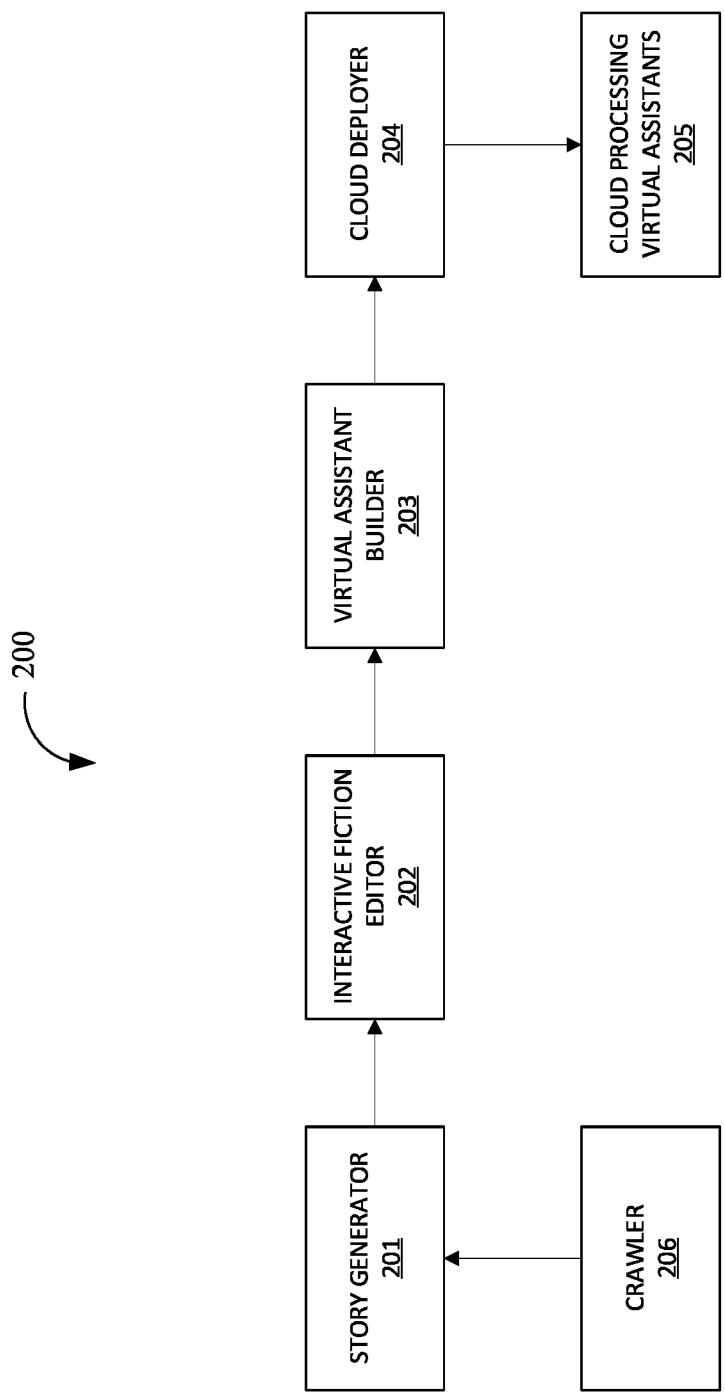
FIG. 2 is a block diagram of a sub-system of the system for creating the virtual assistants, in accordance with some embodiments.

FIG. 2 is a block diagram of a sub-system 200 of the system 100 for creating the virtual assistants, in accordance with some embodiments. Further, the sub-system 200 may include a crawler 206, a story generator 201, an interactive fiction editor 202, a virtual assistant builder 203, a cloud deployer 204, and cloud processing virtual assistants 205.

Figure 3:
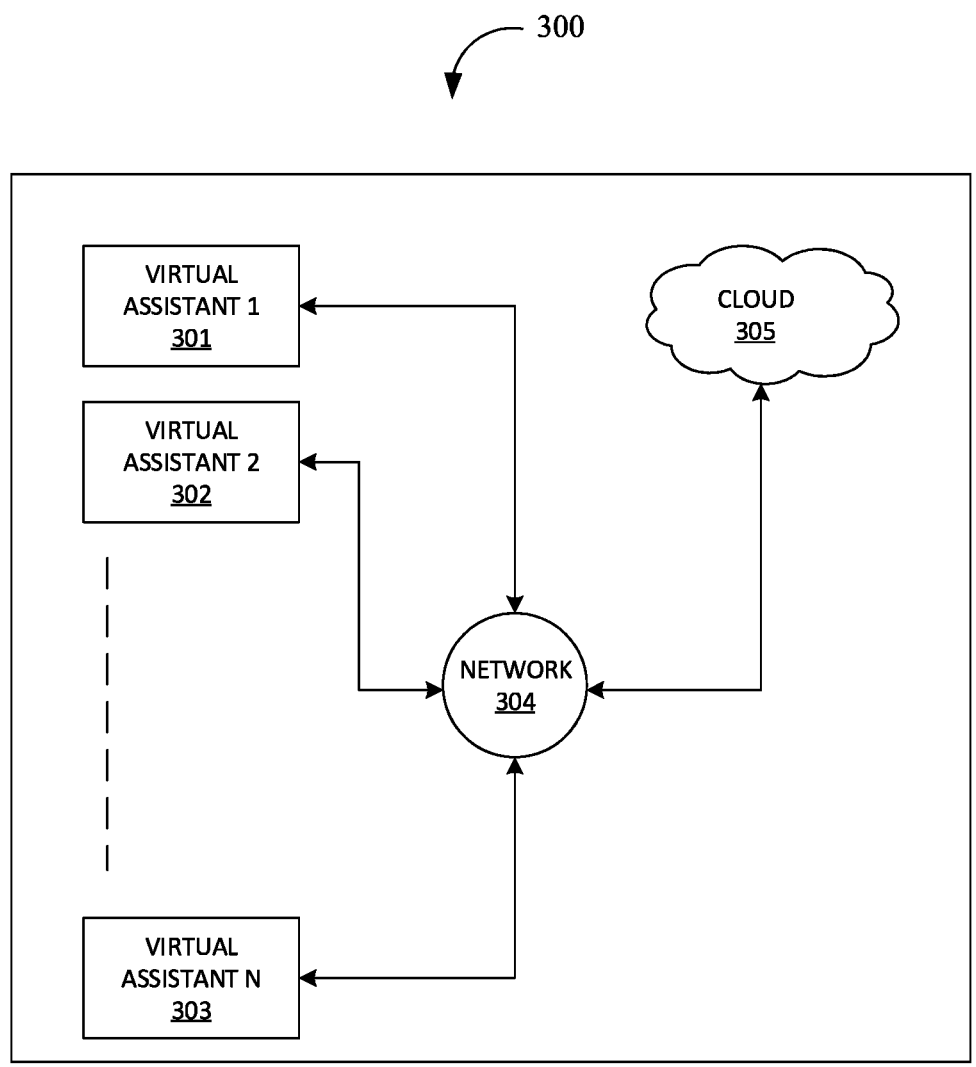
FIG. 3 is a block diagram of a sub-system of the system for creating the virtual assistants, in accordance with some embodiments.

FIG. 3 is a block diagram of a sub-system 300 of the system 100 for creating the virtual assistants, in accordance with some embodiments. Further, the sub-system 300 may include a plurality of virtual assistants 301-303, a network 304, and a cloud 305.

Figure 4:
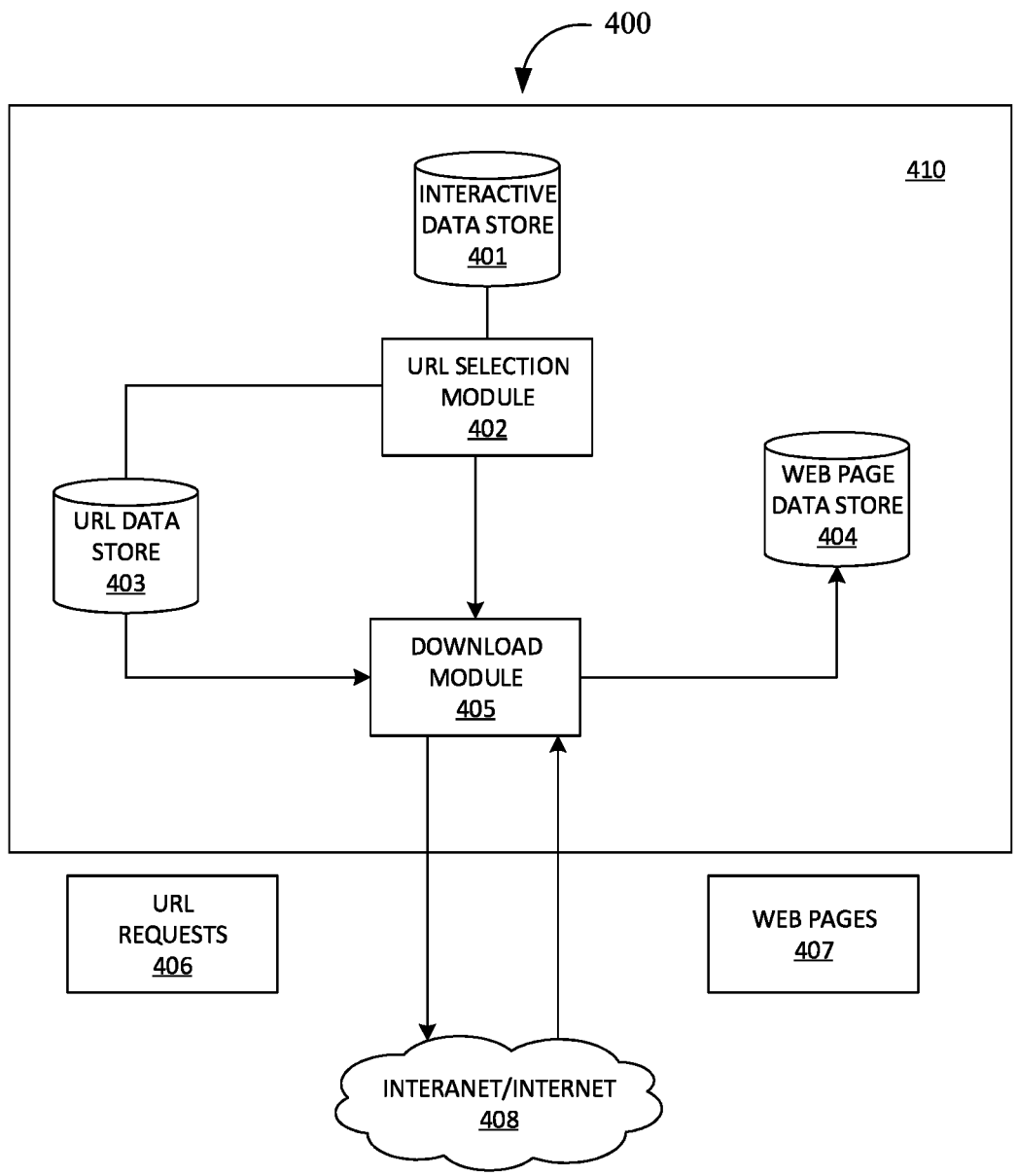
FIG. 4 is a block diagram of a sub-system of the system for creating the virtual assistants, in accordance with some embodiments.

FIG. 4 is a block diagram of a sub-system 400 of the system 100 for creating the virtual assistants, in accordance with some embodiments. Further, the sub-system 400 may include a crawler 410, URL requests 406, web pages 407, and intranet/internet 408. Further, the crawler 410 may include an interactive data store 401, an URL selection module 402, an URL datastore 403, a web page data store 404, and a download module 405.

Figure 5:
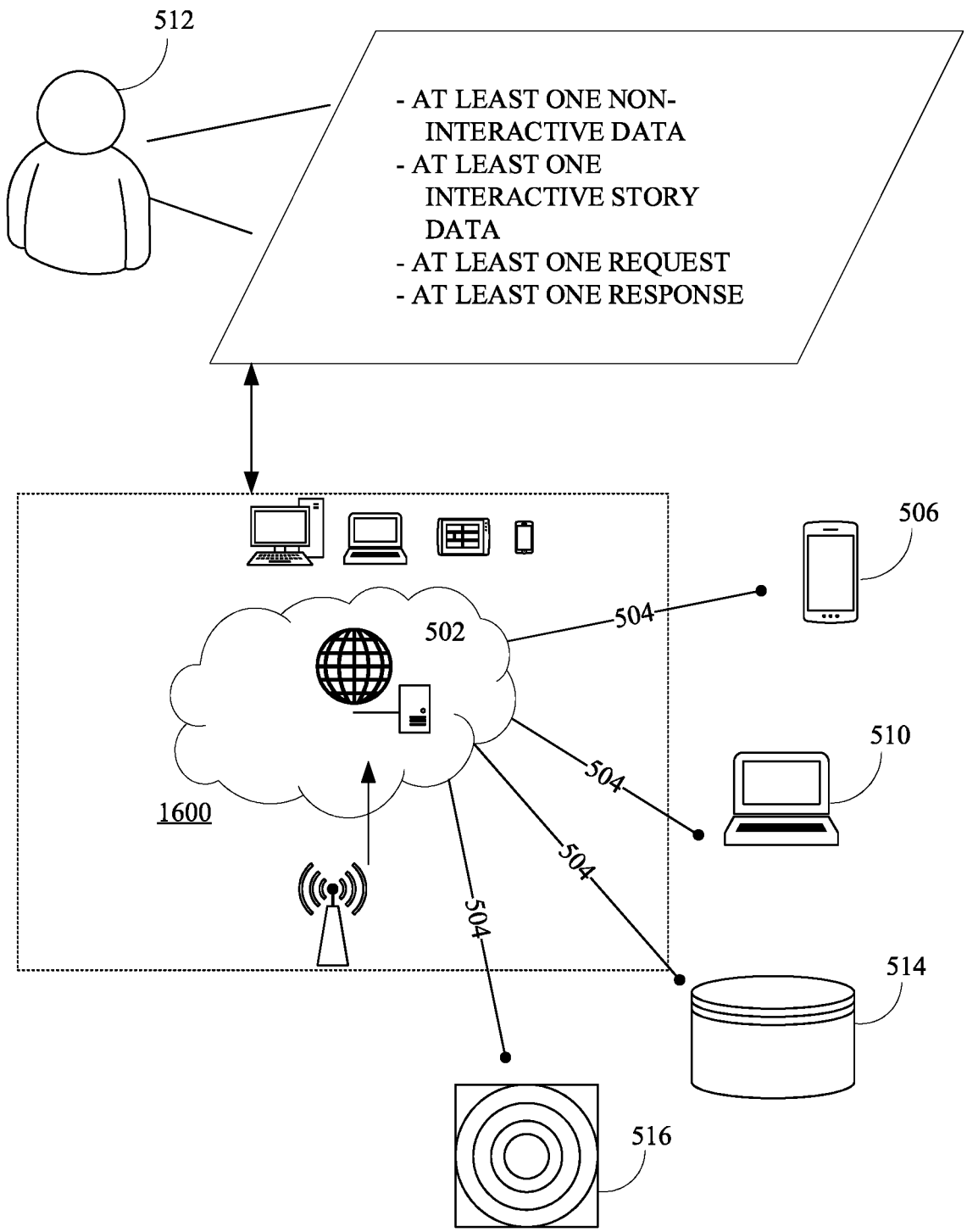
FIG. 5 is an illustration of an online platform consistent with various embodiments of the present disclosure.

FIG. 5 is an illustration of an online platform 500 consistent with various embodiments of the present disclosure. By way of non-limiting example, the online platform 500 to facilitate generation of an interactive story based on non-interactive data may be hosted on a centralized server 502, such as, for example, a cloud computing service. The centralized server 502 may communicate with other network entities, such as, for example, a mobile device 506 (such as a smartphone, a laptop, a tablet computer, etc.), other electronic devices 510 (such as desktop computers, server computers, etc.), databases 514, and sensors 516 over a communication network 504, such as, but not limited to, the Internet. Further, users of the online platform 500 may include relevant parties such as, but not limited to, end-users, administrators, service providers, service consumers, and so on. Accordingly, in some instances, electronic devices operated by the one or more relevant parties may be in communication with the platform.

A user 512, such as the one or more relevant parties, may access online platform 500 through a web-based software application or browser. The web-based software application may be embodied as, for example, but not be limited to, a website, a web application, a desktop application, and a mobile application compatible with a computing device 1600.

Figure 6:
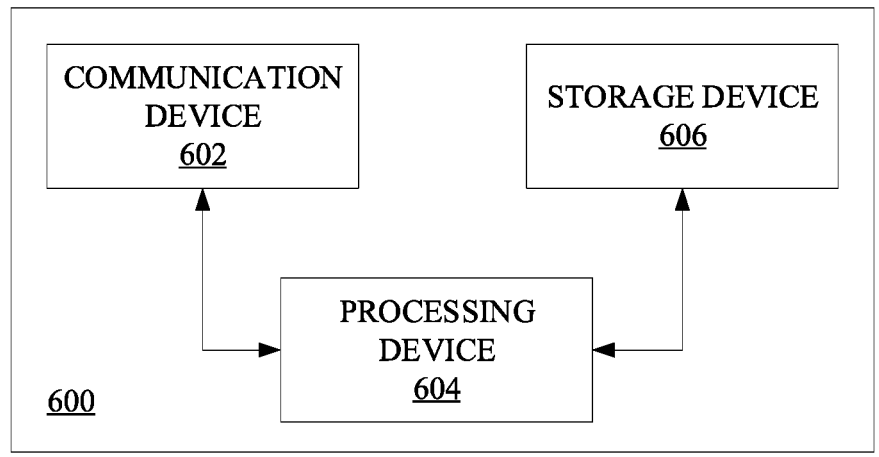
FIG. 6 is a block diagram of a system for facilitating generation of an interactive story based on non-interactive data, in accordance with some embodiments.

FIG. 6 is a block diagram of a system 600 for facilitating generation of an interactive story based on non-interactive data, in accordance with some embodiments. Further, the system 600 may include a communication device 602, a processing device 604, and a storage device 606.

Further, the communication device 602 may be configured for receiving at least one non-interactive data from at least one source device (databases 514). Further, the at least one non-interactive data may include at least one textual content, at least one visual content, at least one audio content, at least one audio-visual content, etc. Further, the at least one source device may include the at least one non-interactive data. Further, the at least one source device may be a storage device configured for storing the at least one non-interactive data. Further, the at least one source device may include a server device, a computing device, etc. Further, the computing device may include a desktop, a laptop, a smartphone, a personal computer, a minicomputer, a microcomputer, a tablet, a smartwatch, etc. Further, the communication device 602 may be configured for transmitting at least one interactive story data to at least one user device (such as the mobile device 506, the electronic devices 510, etc.). Further, the at least one user device may be associated with at least one user (such as the user 512). Further, the at least one user may be an individual, an institution, and an organization that may want to generating the interactive story. Further, the at least one interactive story data may include the at least one textual content, the at least one visual content, the at least one audio content, the at least one audio-visual content, etc. Further, the communication device 602 may be configured for receiving at least one request associated with the at least one interactive story data from the at least one user device. Further, the at least one request may include at least one query, at least one suggestion, etc. Further, the communication device 602 may be configured for transmitting at least one response associated with the at least one request to the at least one user device. Further, the at least one response may include at least one reply for the at least one query.

Further, the processing device 604 may be communicatively coupled with the communication device 602. Further, the processing device 604 may be configured for analyzing the at least one non-interactive data. Further, the processing device 604 may be configured for generating the at least one interactive story data based on the analyzing of the at least one non-interactive data. Further, the processing device 604 may be configured for analyzing the at least one request. Further, the processing device 604 may be configured for generating the at least one response based on the analyzing of the at least one interactive story data and the analyzing of the at least one request.

Further, the storage device 606 may be communicatively coupled with the processing device 604. Further, the storage device 606 may be configured for storing at least one of the at least one non-interactive data, the at least one interactive story data, the at least one request, and the at least one response.

Further, in some embodiments, the processing device 604 may be configured for analyzing the at least one interactive story data. Further, the processing device 604 may be configured for generating a plurality of predicted requests, a plurality of predicted responses associated with the plurality of predicted requests, and an association between the plurality of predicted requests and the plurality of predicted responses based on the analyzing of the at least one interactive story data. Further, the storage device 606 may be configured for storing the plurality of predicted requests, the plurality of predicted responses associated with the plurality of predicted requests, and the association between the plurality of predicted requests and the plurality of predicted responses.

Further, in an embodiment, the processing device 604 may be configured for comparing the at least one request and the plurality of predicted requests. Further, the comparing may include determining at least one similarity between the at least one request and the plurality of predicted requests. Further, the processing device 604 may be configured for identifying at least one predicted response based on the comparing of the at least one request and the plurality of predicted requests. Further, the at least one response may include the at least one predicted response.

Further, in some embodiments, the communication device 602 may be configured for receiving a first data from at least one first device based on the analyzing of the at least one interactive story data and the analyzing of the at least one request. Further, the at least one first device may include a computing device such as, but not limited to, a personal computer, a desktop, a laptop, a smartphone, a tablet, a smartwatch, and so on. Further, the first data may be associated with the at least one request. Further, the first data may characterize the at least one request. Further, the processing device 604 may be configured for analyzing the first data. Further, the generating of the at least one response may be based on the analyzing of the first data.

Further, in some embodiments, the processing device 604 may be configured for identifying a plurality of elements of the at least one non-interactive data based on the analyzing of the at least one non-interactive data. Further, the plurality of elements may include at least one of a subject, an object, etc. associated with the at least one non-interactive data. Further, the processing device 604 may be configured for determining at least one relationship between the plurality of elements. Further, the at least one relationship may include at least one positional relationship, at least one chronological relationship, etc. Further, the at least one relationship may include at least one action, at least one association, etc. Further, the plurality of elements may include a first element and a second element. Further, the at least one relationship may include the at least one action performed by the first element in relation to the second element. Further, the at least one relationship may include the at least one association between the first element and the second element. Further, the generating of the at least one interactive story data may be based on the determining.

Further, in an embodiment, the communication device 602 may be configured for receiving a second data from at least one second device based on the determining. Further, the second data may characterize the plurality of elements. Further, the at least one second device may include a computing device such as, but not limited to, a personal computer, a desktop, a laptop, a smartphone, a tablet, a smartwatch, and so on. Further, the processing device 604 may be configured for analyzing the second data. Further, the processing device 604 may be configured for establishing at least one first relationship between the plurality of elements based on the analyzing of the second data. Further, the generating of the at least one interactive story data may be based on the establishing.

Further, in some embodiments, the at least one request may include a plurality of requests. Further, the at least one response may include a plurality of responses. Further, the communication device 602 may be configured for receiving a first request of the plurality of requests from the at least one user device. Further, the communication device 602 may be configured for transmitting a first response corresponding to the first request to the at least one user device. Further, the processing device 604 may be configured for analyzing the at least one interactive story data and the first request. Further, the processing device 604 may be configured for generating the first response based on the analyzing of the at least one interactive story data and the first request. Further, the processing device 604 may be configured for modifying the at least one interactive story data based on the first request. Further, the processing device 604 may be configured for generating at least one first interactive story data based on the modifying. Further, the storage device 606 may be configured for storing the at least one first interactive story data.

Further, in some embodiments, the at least one non-interactive data may include a website data associated with a website. Further, the website may be associated with the at least one source device. Further, the system 600 may include at least one web crawler (such as the crawler 107). Further, the at least one web crawler may be configured for processing the at least one non-interactive data. Further, the at least one crawler may be configured for generating the at least one interactive story data based on the processing.

Further, in some embodiments, the processing device 604 may be configured for determining at least one category associated with the at least one non-interactive data based on the analyzing of the at least one non-interactive data. Further, the at least one non-interactive data may include at least one subject and at least one description of the at least one subject. Further, the at least one category may include at least one type of the at least one subject. Further, the processing device 604 may be configured for identifying an interactive story template data of a plurality of interactive story template data based on the determining. Further, the processing device 604 may be configured for identifying at least one element of the at least one non-interactive data based on the analyzing of the at least one non-interactive data. Further, the at least one element may be associated with the at least one subject. Further, the processing device 604 may be configured for modifying the interactive story template data based on the at least one element. Further, the generating of the at least one interactive story data may be based on the modifying. Further, the storage device 606 may be configured for storing the plurality of interactive story template data.

Further, in some embodiments, the processing device 604 may be configured for converting each interactive story data of the at least one interactive story data in a passage data. Further, the processing device 604 may be configured for matching the passage data against at least one pattern based on the converting. Further, the processing device 604 may be configured for linking the at least one response to the at least one pattern based on the matching. Further, the processing device 604 may be configured for comparing the at least one request and the at least one pattern. Further, the processing device 604 may be configured for identifying the at least one response corresponding to the at least one request based on comparing. Further, the storage device 606 may be configured for storing the at least one pattern.

Figure 7:
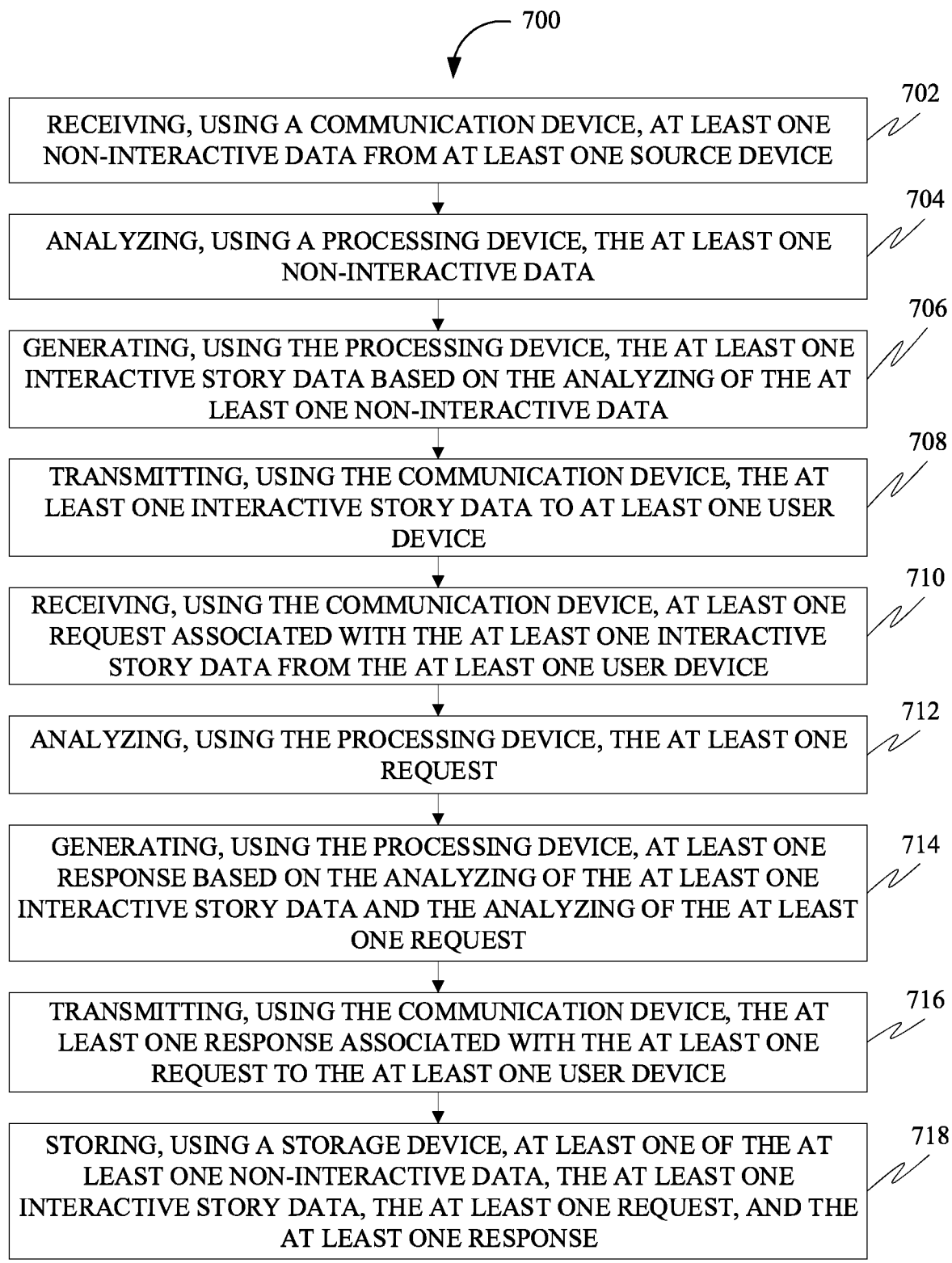
FIG. 7 is a flowchart of a method for facilitating generation of an interactive story based on non-interactive data, in accordance with some embodiments.

FIG. 7 is a flowchart of a method 700 for facilitating generation of an interactive story based on non-interactive data, in accordance with some embodiments. Further, at 702, the method 700 may include a step of receiving, using a communication device (such as the communication device 602), at least one non-interactive data from at least one source device.

Further, at 704, the method 700 may include a step of analyzing, using a processing device (such as the processing device 604), the at least one non-interactive data.

Further, at 706, the method 700 may include a step of generating, using the processing device, the at least one interactive story data based on the analyzing of the at least one non-interactive data.

Further, at 708, the method 700 may include a step of transmitting, using the communication device, the at least one interactive story data to at least one user device.

Further, at 710, the method 700 may include a step of receiving, using the communication device, at least one request associated with the at least one interactive story data from the at least one user device.

Further, at 712, the method 700 may include a step of analyzing, using the processing device, the at least one request.

Further, at 714, the method 700 may include a step of generating, using the processing device, at least one response based on the analyzing of the at least one interactive story data and the analyzing of the at least one request;

Further, at 716, the method 700 may include a step of transmitting, using the communication device, the at least one response associated with the at least one request to the at least one user device; and Further, at 718, the method 700 may include a step of storing, using a storage device (such as the storage device 606), at least one of the at least one non-interactive data, the at least one interactive story data, the at least one request, and the at least one response.

In further embodiments, the at least one non-interactive data may include a website data associated with a website. Further, the website may be associated with the at least one source device. Further, the method 700 may include a step of processing, using at least one web crawler, the at least one non-interactive data. Further, the method 700 may include a step of generating, using the at least one web crawler, the at least one interactive story data based on the processing.

Further, in some embodiments, the method 700 may include applying artificial intelligence technology to process data (such as the at least one non-interactive data) in order to generate the at least one interactive story data. Further, the method 700 may include a step of processing, using the processing device, the data against a plurality of triggering angle data structures corresponding to a plurality of story angles. Further, each of a plurality of the triggering angle data structures may be representative of a characterization of data and having an associated applicability condition for testing against the processed data to determine whether the triggering angle data structure may appropriately characterize the processed data. Further, the method 700 may include a step of determining, using the processing device, at least one of the triggering angle data structures that may appropriately characterize the processed data. Further, the method 700 may include a step of computing, using the processing device, interestingness data relating to the processed data as a function of the at least one triggering angle data structure that may be determined to appropriately characterize the processed data. Further, the method 700 may include a step of comparing, using the processing device, the interestingness data with a threshold. Further, the method 700 may include a step of triggering, using the processing device, an automatic generation of the at least one interactive story data relating to the processed data based on the comparing. Further, the comparing may include a determination that the interestingness data satisfies the threshold. Further details in this regard are disclosed in U.S. Pat. No. 9,208,147, the contents of which are incorporated herein by reference, in its entirety.

Figure 8:
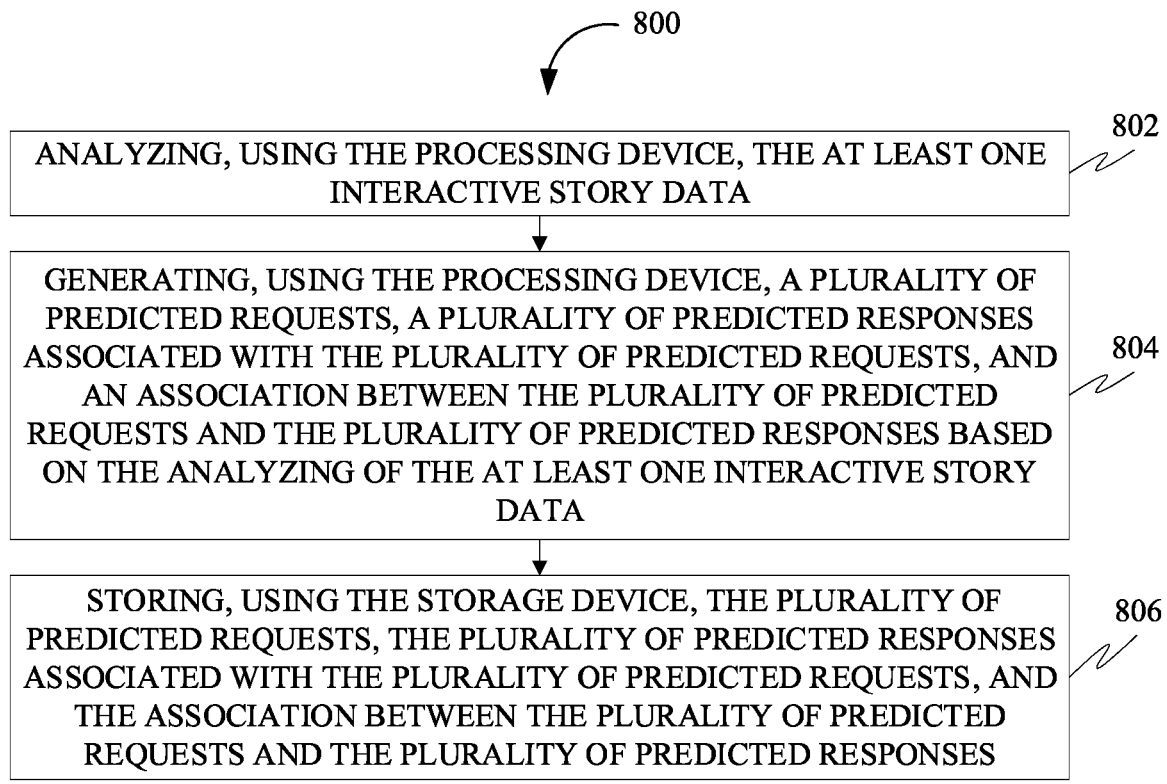
FIG. 8 is a flowchart of a method for facilitating generation of predicted requests and predicted responses based on the interactive story, in accordance with some embodiments.

FIG. 8 is a flowchart of a method 800 for facilitating generation of predicted requests and predicted responses based on the interactive story, in accordance with some embodiments. Further, at 802, the method 800 may include a step of analyzing, using the processing device, the at least one interactive story data.

Further, at 804, the method 800 may include a step of generating, using the processing device, a plurality of predicted requests, a plurality of predicted responses associated with the plurality of predicted requests, and an association between the plurality of predicted requests and the plurality of predicted responses based on the analyzing of the at least one interactive story data.

Further, at 806, the method 800 may include a step of storing, using the storage device, the plurality of predicted requests, the plurality of predicted responses associated with the plurality of predicted requests, and the association between the plurality of predicted requests and the plurality of predicted responses.

Figure 9:
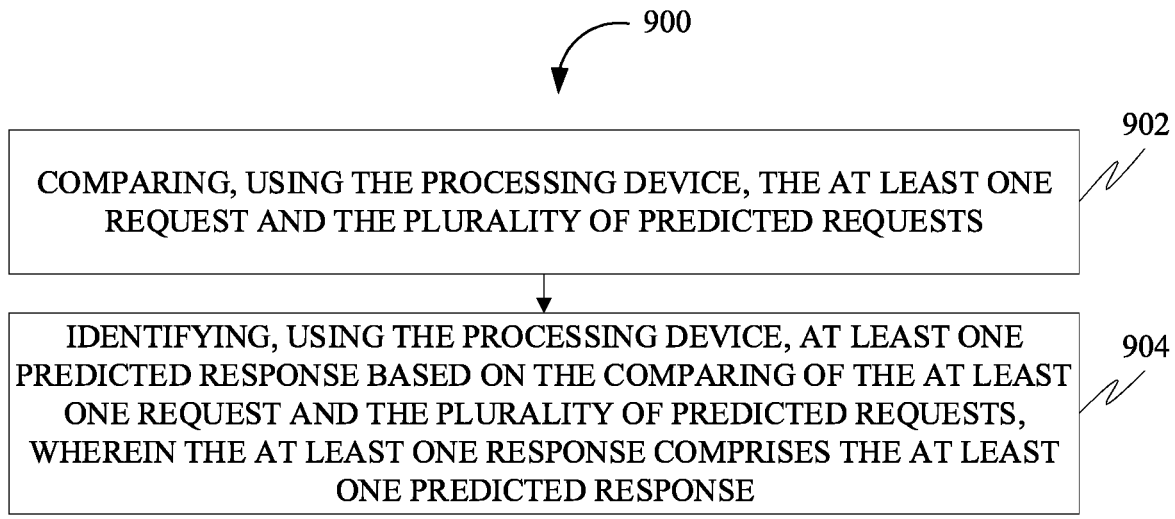
FIG. 9 is a flowchart of a method for facilitating identification of a predicted response for a request, in accordance with some embodiments.

FIG. 9 is a flowchart of a method 900 for facilitating identification of a predicted response for a request, in accordance with some embodiments. Further, at 902, the method 900 may include a step of comparing, using the processing device, the at least one request and the plurality of predicted requests.

Further, at 904, the method 900 may include a step of identifying, using the processing device, at least one predicted response based on the comparing of the at least one request and the plurality of predicted requests. Further, the at least one response may include the at least one predicted response.

Figure 10:
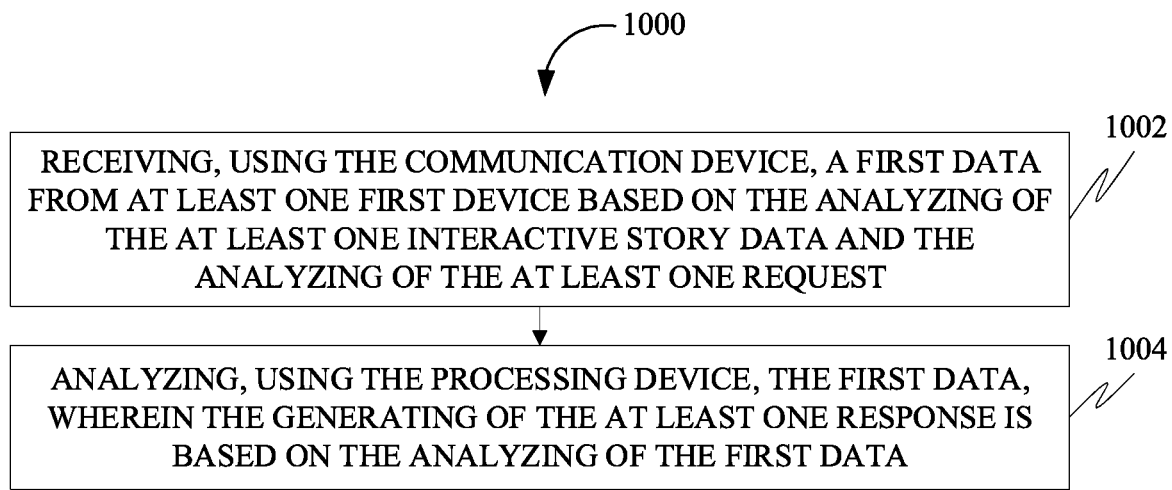
FIG. 10 is a flowchart of a method for facilitating generation of a response for a request based on the interactive story, in accordance with some embodiments.

FIG. 10 is a flowchart of a method 1000 for facilitating generation of a response for a request based on the interactive story, in accordance with some embodiments. Further, at 1002, the method 1000 may include a step of receiving, using the communication device, a first data from at least one first device based on the analyzing of the at least one interactive story data and the analyzing of the at least one request.

Further, at 1004, the method 1000 may include a step of analyzing, using the processing device, the first data. Further, the generating of the at least one response may be based on the analyzing of the first data.

Figure 11:
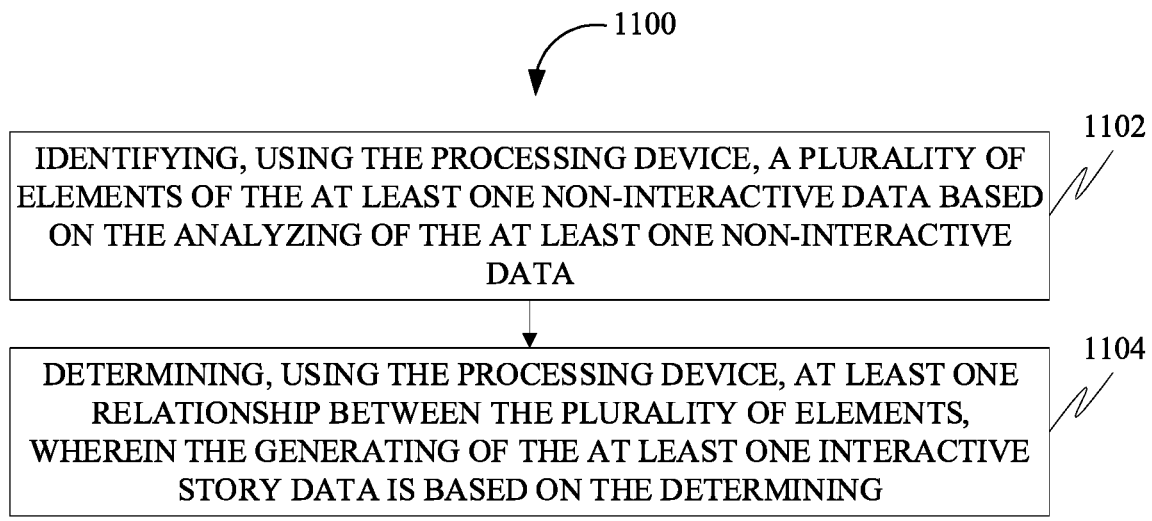
FIG. 11 is a flowchart of a method for facilitating generation of the interactive story based on the non-interactive data, in accordance with some embodiments.

FIG. 11 is a flowchart of a method 1100 for facilitating generation of the interactive story based on the non-interactive data, in accordance with some embodiments. Further, at 1102, the method 1100 may include a step of identifying, using the processing device, a plurality of elements of the at least one non-interactive data based on the analyzing of the at least one non-interactive data.

Further, at 1104, the method 1100 may include a step of determining, using the processing device, at least one relationship between the plurality of elements. Further, the generating of the at least one interactive story data may be based on the determining.

Figure 12:
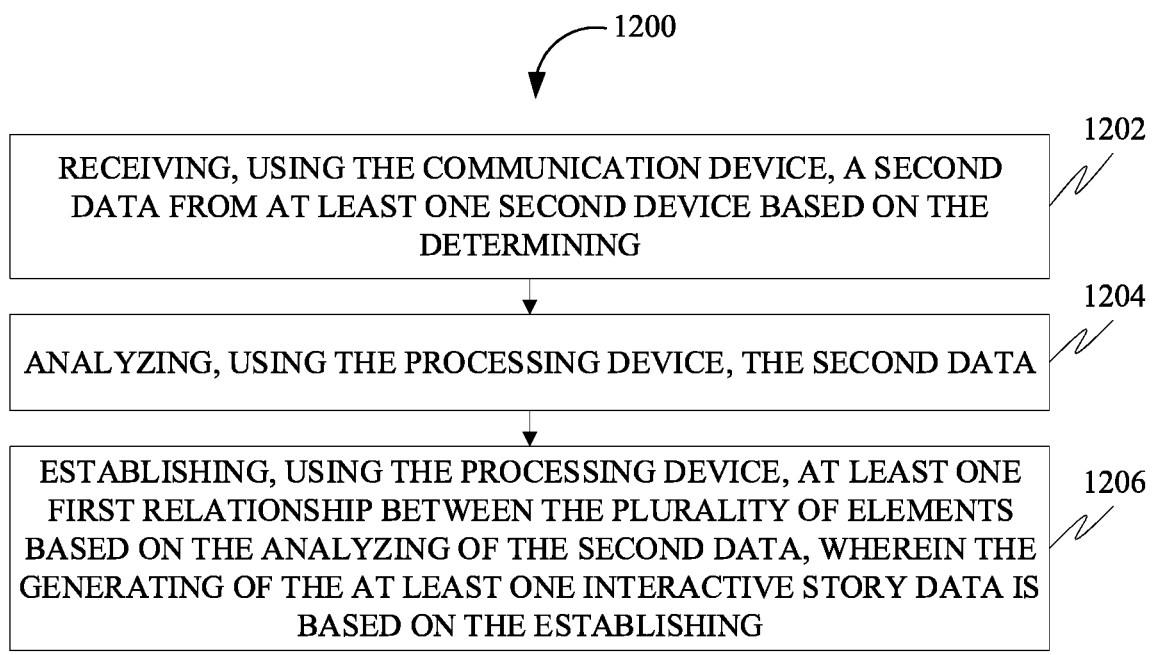
FIG. 12 is a flowchart of a method for facilitating generation of the interactive story based on the non-interactive data, in accordance with some embodiments.

FIG. 12 is a flowchart of a method 1200 for facilitating generation of the interactive story based on the non-interactive data, in accordance with some embodiments. Further, at 1202, the method 1200 may include a step of receiving, using the communication device, a second data from at least one second device based on the determining.

Further, at 1204, the method 1200 may include a step of analyzing, using the processing device, the second data.

Further, at 1206, the method 1200 may include a step of establishing, using the processing device, at least one first relationship between the plurality of elements based on the analyzing of the second data. Further, the generating of the at least one interactive story data may be based on the establishing.

Figure 13:
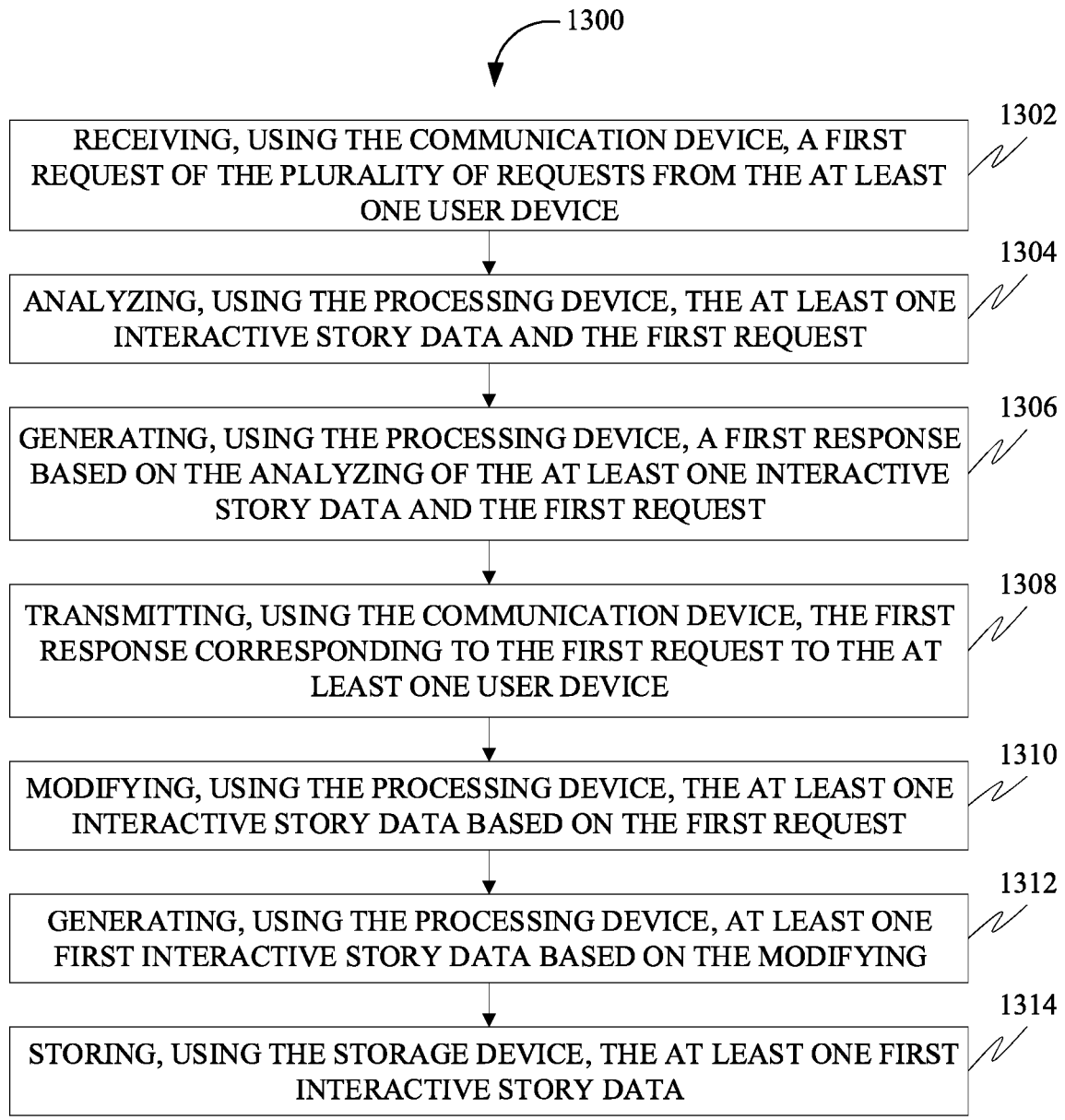
FIG. 13 is a flowchart of a method for facilitating modification of the interactive story based on a request, in accordance with some embodiments.

FIG. 13 is a flowchart of a method 1300 for facilitating modification of the interactive story based on a request, in accordance with some embodiments. Further, at 1302, the method 1300 may include a step of receiving, using the communication device, a first request of the plurality of requests from the at least one user device.

Further, at 1304, the method 1300 may include a step of analyzing, using the processing device, the at least one interactive story data and the first request.

Further, at 1306, the method 1300 may include a step of generating, using the processing device, a first response based on the analyzing of the at least one interactive story data and the first request.

Further, at 1308, the method 1300 may include a step of transmitting, using the communication device, the first response corresponding to the first request to the at least one user device.

Further, at 1310, the method 1300 may include a step of modifying, using the processing device, the at least one interactive story data based on the first request.

Further, at 1312, the method 1300 may include a step of generating, using the processing device, at least one first interactive story data based on the modifying.

Further, at 1314, the method 1300 may include a step of storing, using the storage device, the at least one first interactive story data.

Figure 14:
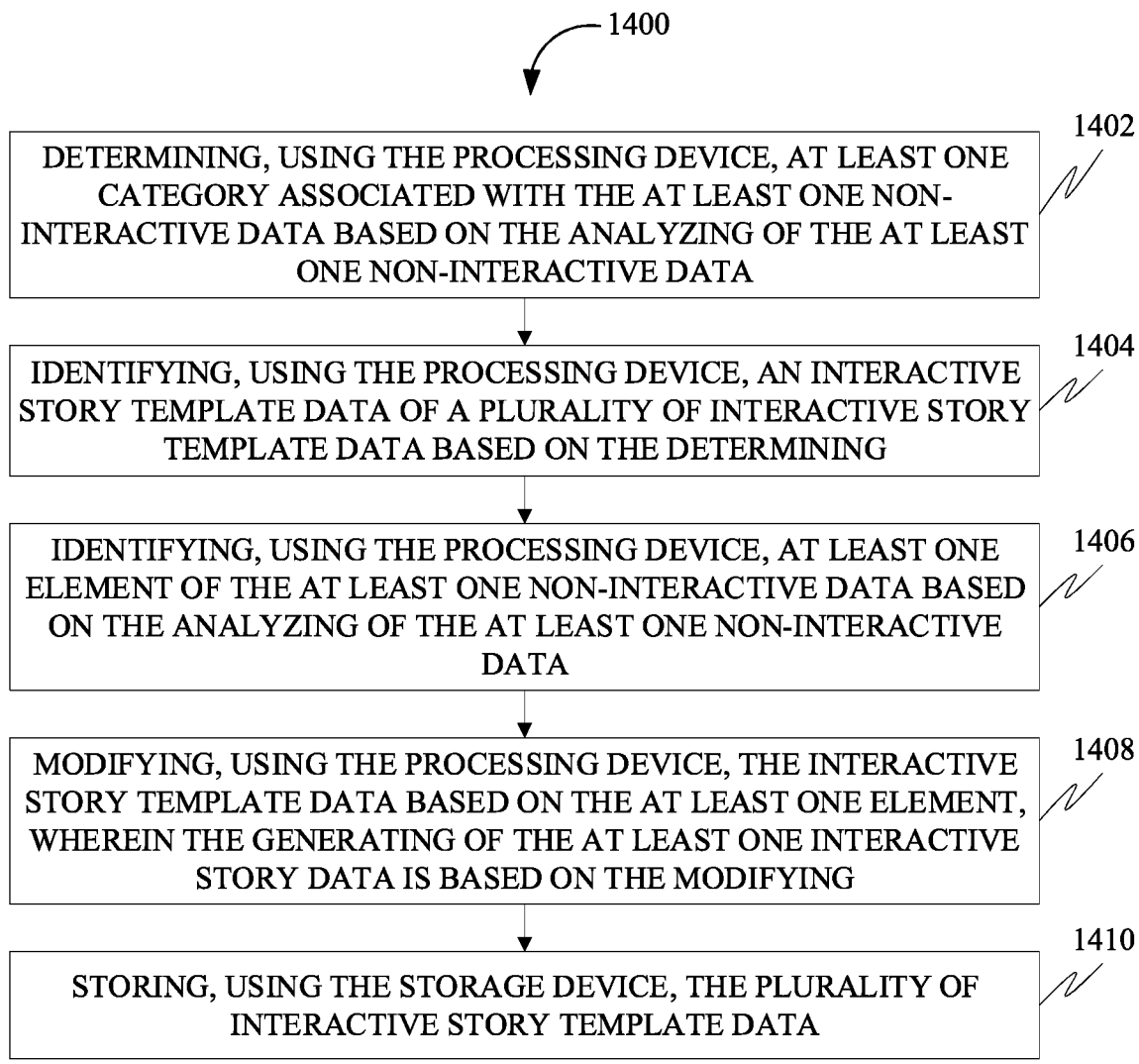
FIG. 14 is a flowchart of a method for facilitating generation of the interactive story based on the non-interactive data, in accordance with some embodiments.

FIG. 14 is a flowchart of a method 1400 for facilitating generation of the interactive story based on the non-interactive data, in accordance with some embodiments. Further, at 1402, the method 1400 may include a step of determining, using the processing device, at least one category associated with the at least one non-interactive data based on the analyzing of the at least one non-interactive data.

Further, at 1404, the method 1400 may include a step of identifying, using the processing device, an interactive story template data of a plurality of interactive story template data based on the determining.

Further, at 1406, the method 1400 may include a step of identifying, using the processing device, at least one element of the at least one non-interactive data based on the analyzing of the at least one non-interactive data.

Further, at 1408, the method 1400 may include a step of modifying, using the processing device, the interactive story template data based on the at least one element. Further, the generating of the at least one interactive story data may be based on the modifying.

Further, at 1410, the method 1400 may include a step of storing, using the storage device, the plurality of interactive story template data.

Figure 15:
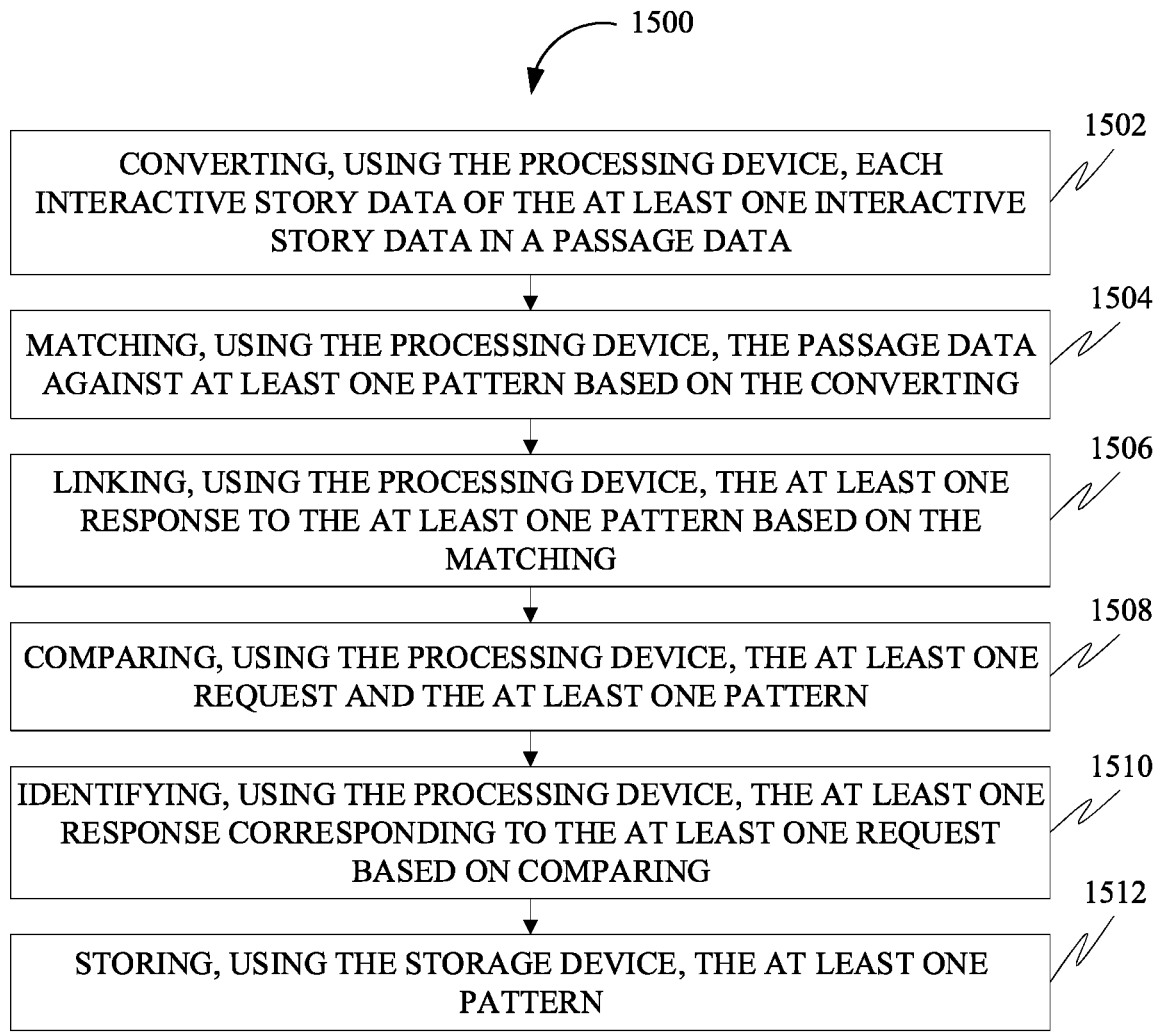
FIG. 15 is a flowchart of a method for facilitating identification of a response based on a pattern, in accordance with some embodiments

FIG. 15 is a flowchart of a method 1500 for facilitating identification of a response based on a pattern, in accordance with some embodiments. Further, at 1502, the method 1500 may include a step of converting, using the processing device, each interactive story data of the at least one interactive story data in a passage data.

Further, at 1504, the method 1500 may include a step of matching, using the processing device, the passage data against at least one pattern based on the converting Further, at 1506, the method 1500 may include a step of linking, using the processing device, the at least one response to the at least one pattern based on the matching.

Further, at 1508, the method 1500 may include a step of comparing, using the processing device, the at least one request and the at least one pattern.

Further, at 1510, the method 1500 may include a step of identifying, using the processing device, the at least one response corresponding to the at least one request based on comparing.

Further, at 1512, the method 1500 may include a step of storing, using the storage device, the at least one pattern.

Figure 16:
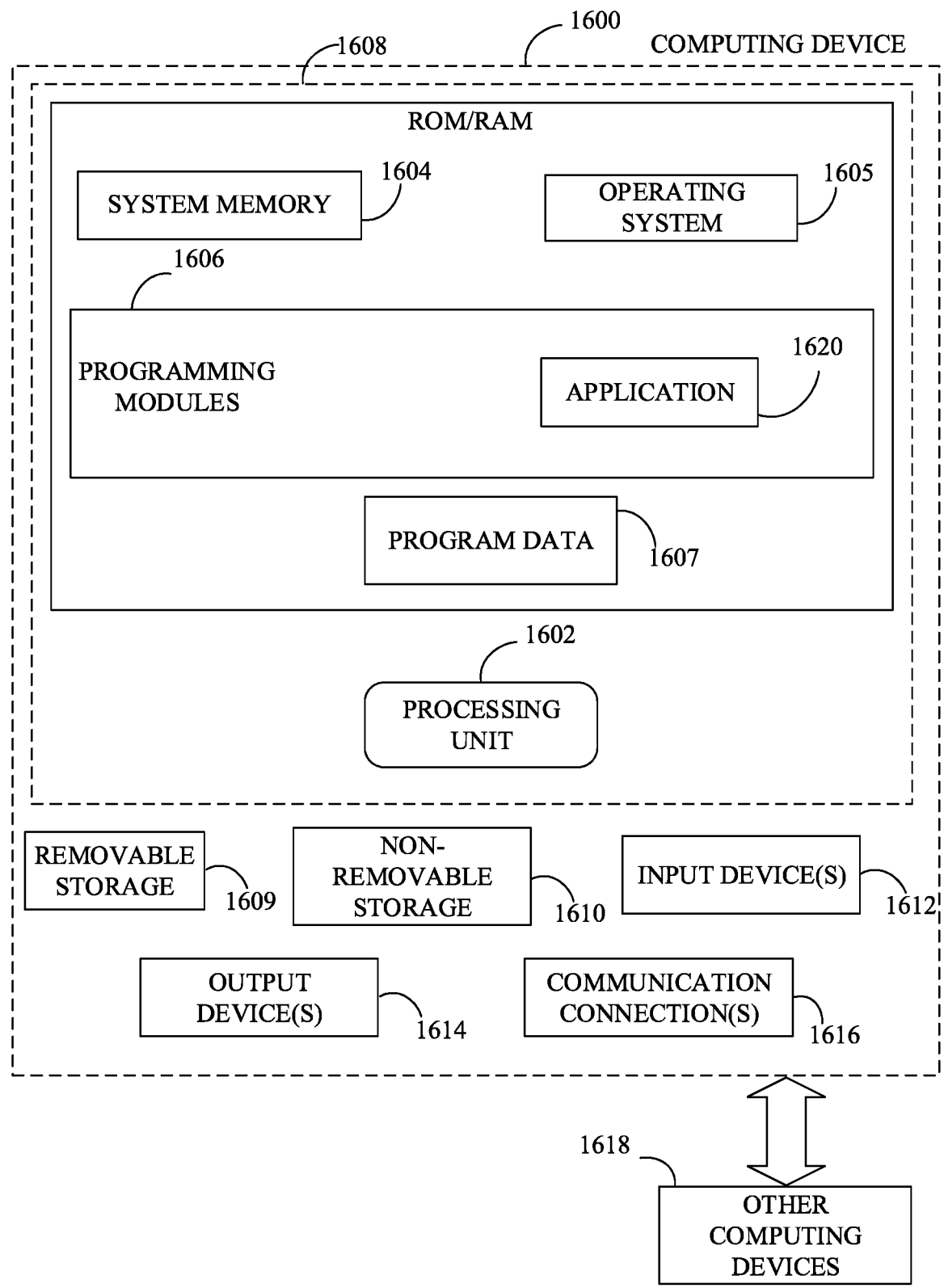
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1604, including operating system 1605. While executing on processing unit 1602, programming modules 1606 may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A system for facilitating generation of an interactive story based on non-interactive data, the system comprising:

a communication device configured for:
receiving at least one non-interactive data from at least one source device, wherein the at least one non-interactive data comprises at least one subject and at least one description of the at least one subject;
transmitting at least one interactive story data to at least one user device;
receiving at least one request associated with the at least one interactive story data from the at least one user device;
transmitting at least one response associated with the at least one request to the at least one user device;
a processing device communicatively coupled with the communication device, wherein the processing device is configured for:
analyzing the at least one non-interactive data using at least one artificial intelligence model, wherein the at least one artificial intelligence model comprises a natural language processing model;
generating the at least one interactive story data based on the analyzing of the at least one non-interactive data;
analyzing the at least one request; and
generating the at least one response based on the analyzing of the at least one interactive story data and the analyzing of the at least one request;
a storage device communicatively coupled with the processing device, wherein the storage device is configured for storing at least one of the at least one non-interactive data, the at least one interactive story data, the at least one request, and the at least one response;
identifying a plurality of elements of the at least one non-interactive data based on the analyzing of the at least one non-interactive data, wherein the plurality of elements is the at least one subject and at least one object comprised in the at least one description;
determining at least one relationship between the plurality of elements, wherein the generating of the at least one interactive story data is based on the determining, wherein the plurality of elements comprises a first element and a second element, wherein the at least one relationship comprises at least one of an action performed by the first element in relation to the second element and an association between the first element and the second element, wherein the communication device is further configured for:
receiving a second data from at least one second device based on the determining, wherein the processing device is further configured for:
analyzing the second data; and
establishing at least one first relationship between the plurality of elements based on the analyzing of the second data, wherein the generating of the at least one interactive story data is based on the establishing.

2. The system of claim 1, wherein the processing device is further configured for:
analyzing the at least one interactive story data; and
generating a plurality of predicted requests, a plurality of predicted responses associated with the plurality of predicted requests, and an association between the plurality of predicted requests and the plurality of predicted responses based on the analyzing of the at least one interactive story data, wherein the storage device is further configured for storing the plurality of predicted requests, the plurality of predicted responses associated with the plurality of predicted requests, and the association between the plurality of predicted requests and the plurality of predicted responses.

3. The system of claim 2, wherein the processing device is further configured for:
comparing the at least one request and the plurality of predicted requests; and
identifying at least one predicted response based on the comparing of the at least one request and the plurality of predicted requests, wherein the at least one response comprises the at least one predicted response.

4. The system of claim 1, wherein the communication device is further configured for receiving a first data from at least one first device based on the analyzing of the at least one interactive story data and the analyzing of the at least one request, wherein the processing device is further configured for analyzing the first data, wherein the generating of the at least one response is based on the analyzing of the first data.

5. The system of claim 1, wherein the at least one request comprises a plurality of requests, wherein the at least one response comprises a plurality of responses, wherein the communication device is further configured for:
receiving a first request of the plurality of requests from the at least one user device;
transmitting a first response corresponding to the first request to the at least one user device, wherein the processing device is further configured for:
analyzing the at least one interactive story data and the first request;
generating the first response based on the analyzing of the at least one interactive story data and the first request;
modifying the at least one interactive story data based on the first request; and
generating at least one first interactive story data based on the modifying, wherein the storage device is further configured for storing the at least one first interactive story data.

6. The system of claim 1, wherein the at least one non-interactive data comprises a website data associated with a website, wherein the website is associated with the at least one source device, wherein the system further comprises at least one web crawler, wherein the at least one web crawler is configured for:
processing the at least one non-interactive data; and
generating the at least one interactive story data based on the processing.

7. The system of claim 1, wherein the processing device is further configured for:
determining at least one category associated with the at least one non-interactive data based on the analyzing of the at least one non-interactive data;
identifying an interactive story template data of a plurality of interactive story template data based on the determining;
identifying at least one element of the at least one non-interactive data based on the analyzing of the at least one non-interactive data; and
modifying the interactive story template data based on the at least one element, wherein the generating of the at least one interactive story data is based on the modifying, wherein the storage device is further configured for storing the plurality of interactive story template data.

8. The system of claim 1, wherein the processing device is further configured for:
converting each interactive story data of the at least one interactive story data in a passage data;
matching the passage data against at least one pattern based on the converting;

linking the at least one response to the at least one pattern based on the matching;
comparing the at least one request and the at least one pattern; and
identifying the at least one response corresponding to the at least one request based on comparing, wherein the storage device is further configured for storing the at least one pattern.

9. A method for facilitating generation of an interactive story based on non-interactive data, the method comprising:
receiving, using a communication device, at least one non-interactive data from at least one source device, wherein the at least one non-interactive data comprises at least one subject and at least one description of the at least one subject;
analyzing, using a processing device, the at least one non-interactive data using at least one artificial intelligence model, wherein the at least one artificial intelligence model comprises a natural language processing model;
generating, using the processing device, at least one interactive story data based on the analyzing of the at least one non-interactive data;
transmitting, using the communication device, the at least one interactive story data to at least one user device;
receiving, using the communication device, at least one request associated with the at least one interactive story data from the at least one user device;
analyzing, using the processing device, the at least one request;
generating, using the processing device, at least one response based on the analyzing of the at least one interactive story data and the analyzing of the at least one request;
transmitting, using the communication device, the at least one response associated with the at least one request to the at least one user device;
storing, using a storage device, at least one of the at least one non-interactive data, the at least one interactive story data, the at least one request, and the at least one response;
identifying, using the processing device, a plurality of elements of the at least one non-interactive data based on the analyzing of the at least one non-interactive data, wherein the plurality of elements is the at least one subject and at least one object comprised in the at least one description;
determining, using the processing device, at least one relationship between the plurality of elements, wherein the generating of the at least one interactive story data is based on the determining, wherein the plurality of elements comprises a first element and a second element, wherein the at least one relationship comprises at least one of an action performed by the first element in relation to the second element and an association between the first element and the second element;
receiving, using the communication device, a second data from at least one second device based on the determining;
analyzing, using the processing device, the second data; and
establishing, using the processing device, at least one first relationship between the plurality of elements based on the analyzing of the second data, wherein the generating of the at least one interactive story data is based on the establishing.

10. The method of claim 9 further comprising:
analyzing, using the processing device, the at least one interactive story data;
generating, using the processing device, a plurality of predicted requests, a plurality of predicted responses associated with the plurality of predicted requests, and an association between the plurality of predicted requests and the plurality of predicted responses based on the analyzing of the at least one interactive story data; and
storing, using the storage device, the plurality of predicted requests, the plurality of predicted responses associated with the plurality of predicted requests, and the association between the plurality of predicted requests and the plurality of predicted responses.

11. The method of claim 10 further comprising:
comparing, using the processing device, the at least one request and the plurality of predicted requests; and
identifying, using the processing device, at least one predicted response based on the comparing of the at least one request and the plurality of predicted requests, wherein the at least one response comprises the at least one predicted response.

12. The method of claim 9 further comprising:
receiving, using the communication device, a first data from at least one first device based on the analyzing of the at least one interactive story data and the analyzing of the at least one request; and
analyzing, using the processing device, the first data, wherein the generating of the at least one response is based on the analyzing of the first data.

13. The method of claim 9, wherein the at least one request comprises a plurality of requests, wherein the at least one response comprises a plurality of responses, wherein the method further comprises:
receiving, using the communication device, a first request of the plurality of requests from the at least one user device;
analyzing, using the processing device, the at least one interactive story data and the first request;
generating, using the processing device, a first response based on the analyzing of the at least one interactive story data and the first request;
transmitting, using the communication device, the first response corresponding to the first request to the at least one user device;
modifying, using the processing device, the at least one interactive story data based on the first request;
generating, using the processing device, at least one first interactive story data based on the modifying; and
storing, using the storage device, the at least one first interactive story data.

14. The method of claim 9, wherein the at least one non-interactive data comprises a website data associated with a website, wherein the website is associated with the at least one source device, wherein the method comprises:
processing, using at least one web crawler, the at least one non-interactive data; and
generating, using the at least one web crawler, the at least one interactive story data based on the processing.

15. The method of claim 9 further comprising:
determining, using the processing device, at least one category associated with the at least one non-interactive data based on the analyzing of the at least one non-interactive data;

identifying, using the processing device, an interactive story template data of a plurality of interactive story template data based on the determining;

identifying, using the processing device, at least one element of the at least one non-interactive data based on the analyzing of the at least one non-interactive data;

modifying, using the processing device, the interactive story template data based on the at least one element, wherein the generating of the at least one interactive story data is based on the modifying; and storing, using the storage device, the plurality of interactive story template data.

16. The method of claim 9 further comprising:

converting, using the processing device, each interactive story data of the at least one interactive story data in a passage data;

matching, using the processing device, the passage data against at least one pattern based on the converting;

linking, using the processing device, the at least one response to the at least one pattern based on the matching;

comparing, using the processing device, the at least one request and the at least one pattern;

identifying, using the processing device, the at least one response corresponding to the at least one request based on comparing; and storing, using the storage device, the at least one pattern.

* * * * *